United States Patent
Wang et al.

(10) Patent No.: US 10,741,183 B2
(45) Date of Patent: Aug. 11, 2020

(54) TRIGGER PHRASE FOR VOICE ACTIONS OF SOFTWARE APPLICATIONS

(71) Applicant: Google LLC, Mountain View, CA (US)

(72) Inventors: Bo Wang, San Jose, CA (US); Sunil Vemuri, Pleasanton, CA (US); Barnaby John James, Los Gatos, CA (US); Pravir Kumar Gupta, Los Altos, CA (US); Nitin Mangesh Shetti, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/101,940

(22) Filed: Aug. 13, 2018

(65) Prior Publication Data
US 2019/0103114 A1 Apr. 4, 2019

Related U.S. Application Data

(63) Continuation of application No. 15/173,823, filed on Jun. 6, 2016, now Pat. No. 10,049,670.

(51) Int. Cl.
*G10L 15/22* (2006.01)
*G10L 15/183* (2013.01)
(Continued)

(52) U.S. Cl.
CPC .............. *G10L 15/30* (2013.01); *G06F 3/167* (2013.01); *G10L 15/1822* (2013.01);
(Continued)

(58) Field of Classification Search
CPC .............. G10L 15/22; G10L 2015/223; G10L 2015/228; G10L 15/183
(Continued)

(56) References Cited

U.S. PATENT DOCUMENTS

| 5,388,198 A | 2/1995 | Layman et al. |
| 6,233,559 B1 * | 5/2001 | Balakrishnan ............ G06F 3/16 |
| | | 704/275 |

(Continued)

FOREIGN PATENT DOCUMENTS

| CN | 101038743 | 9/2007 |
| CN | 103517147 | 1/2014 |

(Continued)

OTHER PUBLICATIONS

United Kingdon Intellectual Property Office; Intention to Grant issued for Application No. GB1621600.4 dated Dec. 21, 2018.

(Continued)

*Primary Examiner* — Martin Lerner
(74) *Attorney, Agent, or Firm* — Middleton Reutlinger

(57) ABSTRACT

Methods, systems, and apparatus for receiving, by a voice action system, data specifying trigger terms that trigger an application to perform a voice action and a context that specifies a status of the application when the voice action can be triggered. The voice action system receives data defining a discoverability example for the voice action that comprises one or more of the trigger terms that trigger the application to perform the voice action when a status of the application satisfies the specified context. The voice action system receives a request for discoverability examples for the application from a user device having the application installed, and provides the data defining the discoverability examples to the user device in response to the request. The user device is configured to provide a notification of the one or more of the trigger terms when a status of the application satisfies the specified context.

17 Claims, 6 Drawing Sheets

(51) Int. Cl.
*G10L 15/30* (2013.01)
*G06F 3/16* (2006.01)
*G10L 15/18* (2013.01)
*G10L 25/72* (2013.01)

(52) U.S. Cl.
CPC ........ *G10L 25/72* (2013.01); *G10L 2015/223* (2013.01); *G10L 2015/225* (2013.01)

(58) Field of Classification Search
USPC ........ 704/231, 251, 255, 270, 275; 715/705, 715/708
See application file for complete search history.

(56) References Cited

U.S. PATENT DOCUMENTS

| | | | |
|---|---|---|---|
| 6,505,160 B1 | 1/2003 | Levy et al. | |
| 8,151,192 B2 | 4/2012 | Black et al. | |
| 8,688,453 B1* | 4/2014 | Joshi | G10L 15/1822 704/257 |
| 8,938,394 B1* | 1/2015 | Faaborg | G10L 15/22 704/275 |
| 9,094,453 B2 | 7/2015 | Ady et al. | |
| 9,123,330 B1* | 9/2015 | Sharifi | G10L 25/51 |
| 9,257,133 B1* | 2/2016 | Strand | G10L 15/25 |
| 9,466,293 B1* | 10/2016 | Gagnon | G10L 15/19 |
| 9,472,196 B1 | 10/2016 | Wang et al. | |
| 9,691,384 B1 | 6/2017 | Wang et al. | |
| 9,741,343 B1* | 8/2017 | Miles | G10L 15/265 |
| 9,922,648 B2 | 3/2018 | Wang et al. | |
| 10,049,670 B2* | 8/2018 | Wang | G10L 15/1822 |
| 10,089,982 B2* | 10/2018 | Wang | G10L 15/18 |
| 10,210,003 B2* | 2/2019 | Ducatelle | G10L 15/22 |
| 10,600,418 B2* | 3/2020 | James | G10L 15/1815 |
| 2002/0133354 A1 | 9/2002 | Ross et al. | |
| 2004/0260562 A1 | 12/2004 | Kujirai | |
| 2005/0114140 A1 | 5/2005 | Brackett et al. | |
| 2007/0213984 A1 | 9/2007 | Ativanichayaphong et al. | |
| 2008/0229198 A1 | 9/2008 | Jung et al. | |
| 2009/0006100 A1* | 1/2009 | Badger | 704/275 |
| 2010/0312547 A1* | 12/2010 | Van Os | G10L 15/26 704/275 |
| 2013/0085755 A1* | 4/2013 | Bringert | G10L 15/28 704/235 |
| 2013/0238991 A1 | 9/2013 | Jung et al. | |
| 2013/0246050 A1 | 9/2013 | Yu et al. | |
| 2013/0317823 A1 | 11/2013 | Mengibar | |
| 2013/0325484 A1* | 12/2013 | Chakladar | G10L 15/22 704/275 |
| 2014/0108927 A1 | 4/2014 | Vaidya et al. | |
| 2014/0136195 A1* | 5/2014 | Abdossalami | G10L 15/26 704/235 |
| 2014/0164312 A1* | 6/2014 | Lynch | G06Q 30/00 706/50 |
| 2014/0195243 A1 | 7/2014 | Cha et al. | |
| 2014/0229110 A1* | 8/2014 | Slusar | G10L 15/18 701/539 |
| 2014/0244271 A1 | 8/2014 | Lindahl | |
| 2014/0278419 A1 | 9/2014 | Bishop et al. | |
| 2014/0323142 A1* | 10/2014 | Rodriguez | G10L 15/22 704/270 |
| 2015/0106836 A1 | 4/2015 | Jordan et al. | |
| 2015/0124944 A1 | 5/2015 | Perotti et al. | |
| 2015/0179174 A1* | 6/2015 | Brand | G10L 15/1815 704/235 |
| 2015/0254058 A1 | 9/2015 | Klein et al. | |
| 2015/0309561 A1* | 10/2015 | Stewart | G06F 3/01 345/156 |
| 2015/0379981 A1 | 12/2015 | Balasubramanian et al. | |
| 2016/0098988 A1 | 4/2016 | Goussard et al. | |
| 2016/0210451 A1 | 7/2016 | Hwang et al. | |
| 2016/0273933 A1* | 9/2016 | Slusar | G10L 15/18 |
| 2016/0293164 A1* | 10/2016 | Shi | G10L 15/1815 |
| 2016/0314791 A1 | 10/2016 | Wang et al. | |
| 2017/0186427 A1* | 6/2017 | Wang | G10L 15/22 |
| 2017/0213559 A1* | 7/2017 | Agrawal | G10L 15/22 |
| 2017/0256256 A1* | 9/2017 | Wang | G10L 15/1822 |
| 2018/0053507 A1 | 2/2018 | Wang et al. | |

FOREIGN PATENT DOCUMENTS

| | | |
|---|---|---|
| CN | 103916708 | 7/2014 |
| JP | 2007249200 A | 9/2007 |
| JP | 2014134675 A | 7/2014 |
| KR | 1020140089861 | 7/2014 |

OTHER PUBLICATIONS

United Kingdon Intellectual Property Office; Examination Report under Section 18(3) of Application No. GB1621600.4; 2 pages.; dated Oct. 30, 2018.

European Patent Office; International Preliminary Report on Patentability of Ser. No. PCT/US2016/069268; 20 pages; dated Sep. 19, 2018.

European Patent Office; Written Opinion of the International Preliminary Examining Authority of International Application No. PCT/US2016/069268; dated Apr. 19, 2018.

United Kingdom Intellectual Property Office; Combined Search and Examination Report issued in Application No. GB1621600.4; dated Jun. 15, 2017.

European Patent Office; International Search Report and the Written Opinion from PCT Application No. PCT/US2016/069268; dated Mar. 30, 2017.

The Japanese Patent Office; Office Action issued in Application No. 2018-562608 dated Feb. 10, 2020. (6 Pages).

China National Intellectual Property Administration; Office Action issue in Application No. 201611259927.2; dated Mar. 31, 2020.

The Korean Intellectual Property Office; Notice of Office Action issue in Application No. 1020187037683; 13 pages; dated May 20, 2020.

The Japanese Patent Office; Final Office Action issued in Application No. 2018-562608; 4 pages; dated Jun. 8, 2020.

* cited by examiner

TRIGGER PHRASE FOR VOICE ACTIONS OF SOFTWARE APPLICATIONS

This application is a continuation of application Ser. No. 15/173,823 filed Jun. 6, 2016, now U.S. Pat. No. 10,049,670 issued 14 Aug. 2018. This specification relates to voice actions, and one particular implementation relates to configuring voice actions and educating users how to use voice actions.

BACKGROUND

Technical Field

A task in an application can include one or more activities defined in software that a user interacts with to perform a certain job. The activity is a class that controls the life cycle of the execution of the task, such the multiple activities exercised within the task can permit the user to perform the job. In some implementations, a command can be associated with an activity or an action related to an activity, such that a user submission of the command can trigger the activity or action. A specific intent can be fired to trigger the starting of the activity or performance of the action. Thus, to trigger the starting of the activity or performance of the action, a user must have knowledge of the command associated with the activity or action used to fire the intent corresponding to the activity or action.

SUMMARY

This specification describes a platform that allows an application developer to deploy new voice actions for previously installed software applications, and implement discoverability examples that inform users how to use the deployed voice actions. In general, using the platform, the application developer can submit information defining the new voice action, where the information specifies the application, an action that the new voice action is directed to triggering, a trigger term for triggering the action, and a context in which the trigger term should be effective to trigger the action in the application. The application developer can also submit information defining discoverability examples for the new voice action, such that a user of the application can be presented with an appropriate discoverability example indicating how the user can trigger the action.

The context submitted by the application developer can specify a user device status when the voice action should be effective to trigger the action in the application. A device status can include, for example, which application(s) is operating in the foreground (i.e., currently active in a user interface of the device) or in the background (i.e., currently hidden from view in the user interface of the device), or can include specific information about applications, such as what activities they are currently running, the status of running activities, and so on.

When the application developer submits information defining the new voice action, the platform, designed as a service or tool, can validate the information defining the new voice action to determine whether the new voice action is compatible with the application, or to otherwise determine whether the new voice action can be implemented. If the new voice action is valid, a new instance of a passive data structure called an intent and having a specific format can be created for the voice action by inducting the information defining the new voice action. The intent can specify some or all of the information defining the new voice action, such as the application, the trigger term, the activity or action to be triggered in response to detecting the trigger term, and context that is necessary for the trigger term to trigger the activity or action. The voice action can then be deployed for the application, such that the voice action becomes an enabled voice action for the application without additional alterations being made to the application code to support the voice action.

Once the voice action has been deployed, a user operating a user device can provide a speech input. The user device can submit context information for the user device, and the context information and a transcription of the speech input can be used to identify an intent and to trigger the identified intent. When the intent is triggered, data for executing the activity or action is determined, and is transmitted to the user device to execute the activity or action in response to the voice input.

For example, an application developer of a media player application can define a new voice action for skipping ahead in a song by a predetermined amount of time that uses the trigger term "skip ahead." For example, the application developer can define a new voice action for skipping ahead by 30 seconds, 60 seconds, or by some other predetermined amount of time in a song that the media player application is currently playing. The application developer can specify a context when the "skip ahead" voice action should be enabled. For example, the application developer may specify that the "skip ahead" voice action should only cause the media player application to skip ahead by the predetermined amount of time in the song when the media player application is running in the foreground and is in a mode that causes the media player application to operate as an audio player. After the voice action has been deployed by the application developer, a user having the media player application previously installed on their user device might submit the voice input "skip ahead." The user device can submit context information indicating a status of the user device or of applications installed on the user device, such as context information indicating that the media player application is running in the foreground and is in audio player mode. In response to receiving the voice input "skip ahead" and the information specifying the context, data can be transmitted to the user device that causes the media player application to skip ahead by the predetermined amount of time in a song that the media player application is currently playing. In contrast, if the voice input is determined to say "skip ahead" but the context information indicates that a social networking application is running in the foreground of the user device instead of the media player application, then the "skip ahead" voice input may not have any effect, or may cause a different operation to be performed at the user device.

Because application developers may deploy any number of new voice actions for a previously installed application, and since those new voice actions may be available to users in a number of different contexts, the platform allows application developers to define discoverability examples that can presented to users to inform the users of available voice actions for a specific context. When submitting information defining a new voice action, an application developer may include information that defines one or more discoverability examples for the new voice action. Discoverability examples may include notifications, such as textual, image, video, or audio notifications, that can be presented to a user of the software application to inform a user that the voice action is available in the present context and how the user can trigger the new voice action.

The information submitted by the application developer defining the discoverability example, can be received by the platform and used to generate data that defines the discoverability example. In some implementations, the generated data can then be provided to user devices having the application installed, and stored at the respective user devices. Storing the generated data at a user device can enable the user device to provide discoverability examples off-line. Thus, if a user of a client device requests discoverability examples in a given context, the user device may be capable of determining the context and selecting discoverability examples stored at the device to provide based on the context, where the selected discoverability examples correspond to voice actions that are capable of being triggered in the current context.

For example, when defining the "skip ahead" voice action, the application developer may also define a discoverability example for the "skip ahead" voice action that includes the textual notification, "Try Saying 'Skip Ahead'." The platform may generate data defining the discoverability example and may transmit the generated data to one or more user devices having the media player application installed. The generated data may be stored at the one or more user devices. Subsequently a user of a user device having the media player installed may request discoverability examples for a current context, for example, by providing a voice input to the user device that includes "What voice commands can I say?" The user device may interpret this voice input as a request for discoverability examples, and may determine a context for the user device and the media player application. Based on determining that the context matches a context for the discoverability example associated with the "skip ahead" voice action, the user device may access information for the discoverability example, and provide a textual notification at the user device that includes the text of the discoverability example, "Try Saying 'Skip Ahead." The user may rely on this discoverability example in determining voice actions available to the user device given the current context of the user device or the media player application.

Innovative aspects of the subject matter described in this specification may be embodied in methods, systems, and non-transitory computer-readable storage devices performing operations including receiving, by a voice action system, data specifying trigger terms that trigger a software application to perform a new voice action and a context that specifies a status of the software application when the new voice action can be triggered, receiving, by the voice action system, data defining a discoverability example for the new voice action, wherein the data defining the discoverability example comprises one or more of the trigger terms that trigger the software application to perform the new voice action when a status of the software application satisfies the specified context, receiving, by the voice action system from a user device having the software application installed, a request for discoverability examples for the software application, and providing, by the voice action system, the data defining the discoverability example to the user device in response to the request, wherein the user device is configured, based at least on the data defining the discoverability example, to provide a notification of the one or more of the trigger terms when a status of the software application satisfies the specified context.

These and other embodiments may each optionally include one or more of the following features. In various examples, these and other embodiments may each optionally include features comprising: receiving, by the voice action system, data corresponding to content that is presentable at a user device as a notification of the one or more of the trigger terms, and providing, by the voice action system, the data corresponding to the content to the user device in response to the request, wherein the user device is configured, based at least on the data corresponding to the content to present the content as a notification of the one or more of the trigger terms when a status of the software application satisfies the specified context. In various examples, these and other embodiments may each optionally include features comprising: generating, by the voice action system, data defining one or more unique candidate discoverability examples for the new voice action, wherein data defining each of the one or more unique candidate discoverability examples comprises one or more of the trigger terms, receiving, by the voice action system, data indicating a selection of a particular candidate discoverability example from among the one or more unique candidate discoverability examples, and providing, by the voice action system, data defining the particular candidate discoverability example to the user device in response to the request, wherein the user device is configured, based at least on the data defining the particular candidate discoverability example, to provide a notification of the one or more of the trigger terms that corresponds to the particular candidate discoverability example when a status of the software application satisfies the specified context.

In various examples, these and other embodiments may each optionally include features comprising: receiving, by the voice action system from the user device having the software application installed, data indicating a status of the software application, determining, by the voice action system and based on the data indicating the status of the software application, that the status of the software application satisfies the specified context; and providing, by the voice action system, the data defining the discoverability example to the user device in response to determining that the status of the software application satisfies the specified context, wherein the user device is configured, based at least on the data defining the discoverability example, to receive the discoverability example and to provide a notification of the one or more of the trigger terms in response to receiving the discoverability example.

In various examples, the specified context indicates that the software application is performing a specific activity; the specified context indicates that a specific activity that the software application is performing is in a particular activity state; the specified context indicates that the software application is operating in the foreground of a user device having the software application installed; the specified context indicates that the software application is operating in the background of a user device having the software application installed.

In various examples, these and other embodiments may each optionally include features comprising: receiving, by the voice action system, data specifying (i) trigger terms that trigger the software application to perform a second new voice action and (ii) the specified context, receiving, by the voice action system, data defining a second discoverability example for the second new voice action, wherein the data defining the second discoverability example comprises one or more of the trigger terms that trigger the software application to perform the second new voice action when a status of the software application satisfies the specified context, and providing, by the voice action system, the data defining the second discoverability example to the user device in response to the request, wherein the user device is configured, based at least on the data defining the second discoverability example, to provide a notification of the one or more of the trigger terms that trigger the software application to perform the new voice action and of the one or more of the trigger terms that trigger the software application to perform the second new voice action when a status of the software application satisfies the specified context.

In various examples, a status of the software application is determined in response to detecting a user input at the user device that requests a notification of trigger terms that trigger the software application to perform voice actions; a status of the software application is determined in response to determining that a status of the software application has changed; a status of the software application is determined in response to determining that the software application has been launched at the user device; the notification of the one or more of the trigger terms is one of a textual notification, an image notification, a video notification, or an audio notification. In various examples, these and other embodiments may each optionally include features comprising: storing, at the voice action system, the data defining the discoverability example at a database that includes data defining one or more other discoverability examples, wherein at least one of the one or more other discoverability examples is a discoverability example for a different voice action.

In various examples, the user device is configured to: determine that a status of the software application satisfies a context specified for each of two or more different voice actions, identify discoverability examples that are defined for the two or more different voice actions, wherein each of the discoverability examples comprises one or more trigger terms that trigger the software application to perform one of the two or more different voice actions, select a subset of the discoverability examples, and provide a notification of the one or more trigger terms of each of the discoverability examples included in the subset. In various examples, selecting the subset of the discoverability examples comprises: ranking the discoverability examples that are defined for the two or more different voice actions, and selecting the subset of the discoverability examples based at least on the ranking. In various examples, selecting the subset of the discoverability examples comprises: determining a relevance of each of the two or more different voice actions to the context specified for each of the two or more different voice actions, and selecting the subset of the discoverability examples based at least on the determined relevance of each of the two or more different voice actions to the context specified for each of the two or more different voice actions. In various examples, selecting the subset of the discoverability examples comprises: accessing information indicating past user activity at the user device when the status of the software application satisfies the context specified for each of the two or more different voice actions, and selecting the subset of the discoverability examples based at least on the accessed information indicating the past user activity at the user device when the status of the software application satisfies the context specified for each of the two or more different voice actions.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1A:
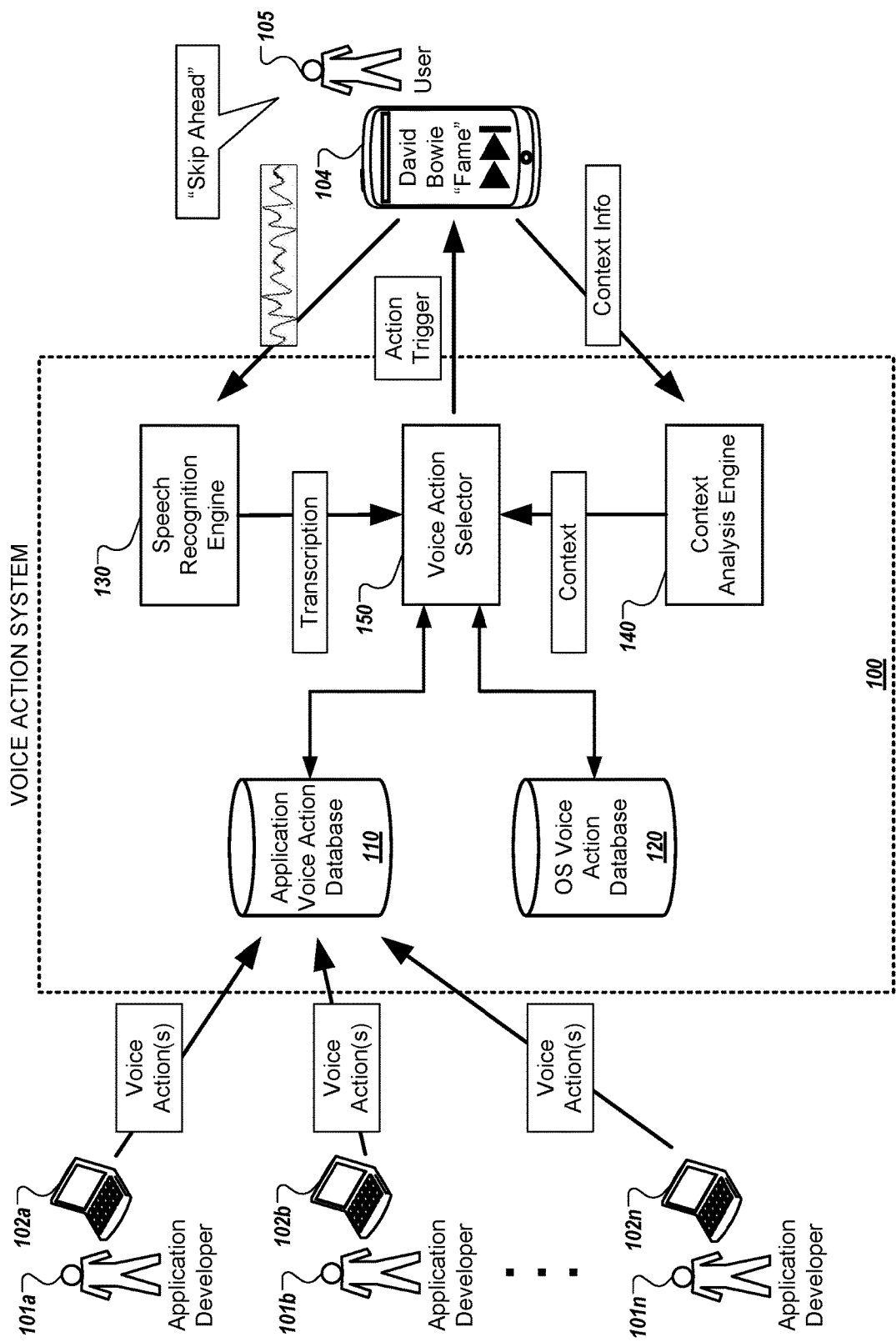
FIGS. 1A, 1B, and 1C depicts an example system for a voice action development system and service.

FIG. 1A illustrates an example of a voice action system 100. The voice action system 100 provides a platform and service whereby an application developer can establish new voice actions for an application that has previously been installed on other users' devices. Thereafter, users of the application having the application installed on their devices can use voice commands in order to cause the application to perform a specific operation as specified by the new voice action. The voice action system 100 may also provide a platform and service, discussed in further detail with respect to FIGS. 1B and 1C, whereby the application developer can establish discoverability examples for voice actions. The discoverability examples can be provided to users to inform them of voice actions that are available and how those voice actions can be triggered.

The voice action system 100 receives from terminals 102a-102n data defining new voice actions submitted by application developers 101a-101n, wherein the new voice actions are for one or more different applications. The voice action system 100 can determine whether each new voice action is a valid voice action. Each new voice action that is determined to be valid can be inducted to generate an intent corresponding to the new voice action, and the intent corresponding to the new voice action can be stored at an application voice action database 110 of the voice action system 100.

For example, the voice action system 100 may have a validation engine that receives and validates the data defining the new voice action. Validating the data may include determining that the formatting of the data defining the voice action complies with requirements, determining that the new voice action is compatible with the specified application, or otherwise determining that a voice action can be established based on the data received from the application developer 101a-101n. An indication engine of the voice action system 100 can receive the validated data defining the new voice action, and can induct the data to generate the intent corresponding to the new voice action. The intent can then be stored in the application voice action database 110.

The application voice action database 110 can store voice actions that pertain to activities or actions that can be performed within numerous different software applications. The voice actions included in the application voice action database 110 may include built-in voice actions that were submitted by application developers 101a-101n when the application was built, as well as voice actions that were submitted by application developers 101a-101n after the application was built for operations supported by the application.

The voice actions can also include application-specific voice actions that are supported by default by the operating system. These pre-supported voice actions may be voice actions that are capable of being implemented in applications without having to be submitted to the voice action system 100 by an application developer 101a-101n. For example, the voice action "exit application" to exit a task or activity running in the foreground may be automatically available for any application, and may be included in the application voice action database 110 for each application, without an application developer 101*a*-101*n* having to submit information to the voice action system 100 to define the "exit application" voice action.

In addition to the application voice action database 110, the voice action system 100 can include an operating system (OS) voice action database 120 that stores voice actions that are not associated with any particular application or context. For example, a "lock phone" voice action that causes a device to enter a locked state may be a voice action that is specified in the OS voice action database 120 as a voice action that is not associated with a particular application, or that is universally accessible, i.e., regardless of a device's status when the "lock device" voice action is detected. Generally, the voice actions stored in the OS voice action database 120 are voice actions that are not generated based on application developers 101*a*-101*n* defining the voice actions, since the voice actions stored at the OS voice action database 120 are generic to a user device operating environment and not any particular application generated by third party application developers 101*a*-101*n*.

The voice action system 100 enables a user 105 having a user device 104 to provide spoken voice input to their user device 104 to cause actions to be performed by the user device 104 or applications operating on their user device 104. For example the user 105 having the user device 104 has a media player application running on their user device 104 and provides the spoken input "skip ahead" while the media player application is running in the foreground of the user device 104 and is operating the media player application in an audio player mode.

Audio data corresponding to the spoken input and context information specifying a status of the user device 104, including the status of applications running on the user device 104, is transmitted to the voice action system 100. Specifically, for the example shown in FIG. 1A, the audio data corresponding to the voice input "skip ahead" is received by a speech recognition engine 130 of the voice action system 100, and the context information indicating the status of the user device 104 is received by a context analysis engine 140 of the voice action system 100. The context information may indicate that the media player application is running in the foreground of the user device 104, that the media player application is currently in an audio player mode, and may indicate other information about the status of the user device 104 and applications installed on the user device 104.

The speech recognition engine 130 receives the audio data corresponding to the voice input, generates a transcription of the voice input, and provides the transcription of the voice input to the voice action selector 150. The context analysis engine 140 receives the context information from the user device 104 and processes the context information to determine relevant context information. For example, the context analysis engine 140 may analyze the context information to identify applications that are installed on the user device 104, and metadata associated with each of those applications may specify available voice actions for the application and context information that is relevant to determining which of the voice actions might be enabled for a given device status. In some instances, based on the analysis, the context analysis engine 140 may determine that additional context information is required to identify which voice actions should be enabled for a particular status of the user device 104, and so the context analysis engine 140 may request additional context information from the user device 104. The context analysis engine 140 forwards the processed context information to the voice action selector 150.

For example, as shown in FIG. 1A, the speech recognition engine 130 may receive the audio data corresponding to the voice input "skip ahead" and may obtain a transcription of the voice input. The context analysis engine 140 receives context information from the user device 104 that specifies that the media player application is running in the foreground, that the media player application is operating in an audio player mode, and that specifies other information about the user device 104. For instance, the context information may also indicate that a social network application is operating in the background of the user device 104 and that the battery life of the user device 104 is currently 50%. The context analysis engine 150 may receive information indicating that the user device 104 has both the media player and social network applications installed and may determine that neither the media player application nor the social network application enables voice actions based on context information that indicates a device battery life. Therefore, the context analysis engine 140 may filter the context information to indicate only that the media player application is operating in the foreground of the user device 104, that the media player application is in an audio player mode, and that the social network application is operating in the background of the user device 104. The filtered context information and the transcription of the voice input "skip ahead" may then be provided to the voice action selector 150.

The voice action selector 150 receives the transcription of the spoken input from the speech recognition engine 130 and a context from the context analysis engine 140 that includes processed context information. The voice action selector 150 uses the transcription and the context to identify a particular intent associated with a particular voice action to trigger at the user device 104. For example, the voice action selector 150 can access the application voice action database 110 and the OS voice action database 120 to identify a set of candidate voice actions that are enabled for the present context of the user device 104. Identifying the set of candidate voice actions can include identifying a set of intents stored at the application voice action database 110 or the OS voice action database 120 that specify contexts matching the context received by the voice action selector 150.

Having identified the set of candidate voice actions that are enabled for the presented context, the voice action selector 150 can compare the transcription of the voice input to one or more trigger phrases associated with each of the enabled voice actions. In general, a trigger phrase can include one or more trigger terms, and operates as an identifier for a voice action, such that detection of the one or more terms of a particular trigger phrase results in identification and triggering of the voice action corresponding to the particular trigger phrase. For instance, the voice action selector 150 can compare the transcription to respective trigger phrases associated with the intents of the enabled voice actions. The voice action selector 150 identifies a particular intent for a particular voice action based on determining that the transcription matches a trigger term specified by the intent associated with the particular voice action.

For example, the voice action selector 150 can receive the transcription of the voice input "skip ahead" and the context for the user device 104, and can use the received context to identify candidate voice actions to initiate at the user device 104, i.e., voice actions that can be initiated at the user device 104 based on the current status of the user device 104. After determining the set of candidate voice actions for the context of the user device 104, the voice action selector 150 compares the transcription of the voice input "skip ahead" to trigger phrases specified by the intents of the candidate voice actions. The voice action selector 150 can determine that the transcription "skip ahead" matches the trigger phrase specified by the intent of the "skip ahead" voice action for the media player application.

The "skip ahead" voice action may be a voice action for causing the media player application to skip ahead by a predetermined amount of time in a song that the media player application is currently playing. For example, the "skip ahead" voice action may cause the media player application to fast forward by a predetermined amount of time, such as 30 seconds, 60 seconds, or other amount of time specified, for example, by an application developer 101a-101n or user 105. Thus, if the media player application is playing a song and is 1 minute and 15 seconds into the song when it receives the "skip ahead" voice action, the media player application may skip ahead in the song to a point 1 minute and 45 seconds into the song. In some examples, if the amount of time remaining in the song when the "skip ahead" voice action is received is less than the predetermined amount of time, the media player application may cause the media player application to skip ahead to a next song.

A transcription is identified as matching a trigger phrase based on determining that at least a portion of the transcription matches one or more terms of the trigger phrase. For example, a match between a transcription and a trigger phrase may be identified based on each of the terms of the transcription matching each of the terms of the trigger phrase. In some implementations, a match may be identified based on determining that less than all of the terms of the transcription match terms of the trigger phrase. For example, a transcription may match a trigger phrase even if some of the terms of the trigger phrase are absent from the transcription, if the transcription includes terms in addition to those of the trigger phrase, or if one or more terms of the transcription are different from terms of the trigger phrase. Thus, each of the transcriptions "new email," "send new email," or "open up new email" may be identified as matching the trigger phrase "open new email," despite each of the transcriptions failing to precisely match the trigger phrase. In some instances, a transcription may be identified as matching a trigger phrase if the transcription includes some or all of the terms of the trigger phrase in a different order than the order specified by the trigger phrase. For example, the transcription "lock phone" may be identified as matching a "phone lock" trigger phrase. In some instances, a transcription may be identified as matching a trigger phrase based on determining that the transcription includes one or more synonyms or alternate terms for terms of the trigger phrase. Thus, the transcriptions "draft new email" or "open new email" may be identified as matching the trigger phrase "write new email" based on "draft" being a synonym of "write," and "open" being an identified alternate term for "write."

Having identified the particular voice action, the voice action selector 150 provides action trigger data to the user device 104 that causes the activity or action associated with the particular voice action to be initiated. To do so, the voice action selector 150 can obtain information for controlling the user device 104 to perform the action or activity associated with the selected voice action. In some instances, controlling the user device 104 to perform the action or activity associated with the selected voice action can include firing an intent of the selected voice action. Firing the intent of the selected voice action may cause information for initiating the activity or action associated with the selected voice action to be provided to the user device 104.

For example, the intent for the selected voice action can include data that causes actions or activities associated with the voice action to be performed by the application associated with the voice action. The selected intent can be transmitted to the user device 104, such that receipt of the intent by the user device 104 can act as a request or can trigger performance of the actions or activities associated with the voice action. Alternatively, the voice action selector 150 can determine other data to operate as action trigger data that causes the selected voice action to be performed at the user device 104, and can transmit the information to the user device 104. For example, an intent may only identify the actions or activities to be performed by the user device 104 to perform the voice action, and the voice action selector 150 can determine action trigger data that can control the application on the user device 104 to perform the actions or activities associated with the voice action. The determined action trigger data can be transmitted to the user device 104 such that the action trigger data causes the actions or activities associated with the voice action to be performed.

For instance, after selecting the "skip ahead" voice action from among the set of candidate voice actions, the voice action selector 150 transmits the intent for the "skip ahead" voice action to the user device 104, or obtains other information for controlling the media player application running on the user device 104 to skip ahead by a predetermined amount of time in a song that the media player application is currently playing. The voice action selector 150 transmits the data for controlling the media player application to skip ahead by the predetermined amount of time in the song to the user device 104, which in turn initiates a process for the media player application running on the user device 104 to skip ahead by the predetermined amount of time in the song, for example, to skip ahead by the predetermined amount of time in the song "Fame" by David Bowie.

Briefly, as discussed, the system of FIG. 1A includes one or more terminals 102a-102n corresponding to one or more application developers 101a-101n. The terminals 102a-102n can each be in communication with the voice action system 100, for example, over one or more wired or wireless networks. Each of the terminals 102a-102n can be a mobile device, such as a cellular phone, smartphone, tablet computer, laptop computer, personal digital assistant (PDA), netbook computer, or other mobile computing device, or may be any stationary computing device, such as a desktop computer or other stationary computer. A user device 104 associated with a user 105 can also be in communication with the voice action system 100 over one or more wired or wireless networks, where the user device 104 may also be a mobile or stationary computing device, such as a cellular phone, smartphone, tablet computer, netbook, personal digital assistant, laptop computer, desktop computer, or other computing device.

The example voice action system 100 shown in FIG. 1A includes an application voice action database 110, operating system (OS) voice action database 120, speech recognition engine 130, context analysis engine 140, and voice action selector 150. Each of the components of the voice action system 100, including the application voice action database 110, OS voice action database 120, speech recognition engine 130, context analysis engine 140, and voice action selector 150, may be in communication with one or more other components of the voice action system 100 over one or more wired or wireless data pathways that enable that exchange of electronic communications. In some implementations, one or more of the components of the voice action system 100 may be combined such that their functions are performed by a single component, or may be represented by two or more components such that their functions are dispersed across the two or more components. The components of the voice action system 100 may be implemented on a single computing device, such as a single server system, or may be implemented on multiple computing devices that are in communication over one or more wired or wireless data pathways that enable the exchange of electronic communications between the components.

Figure 1B:
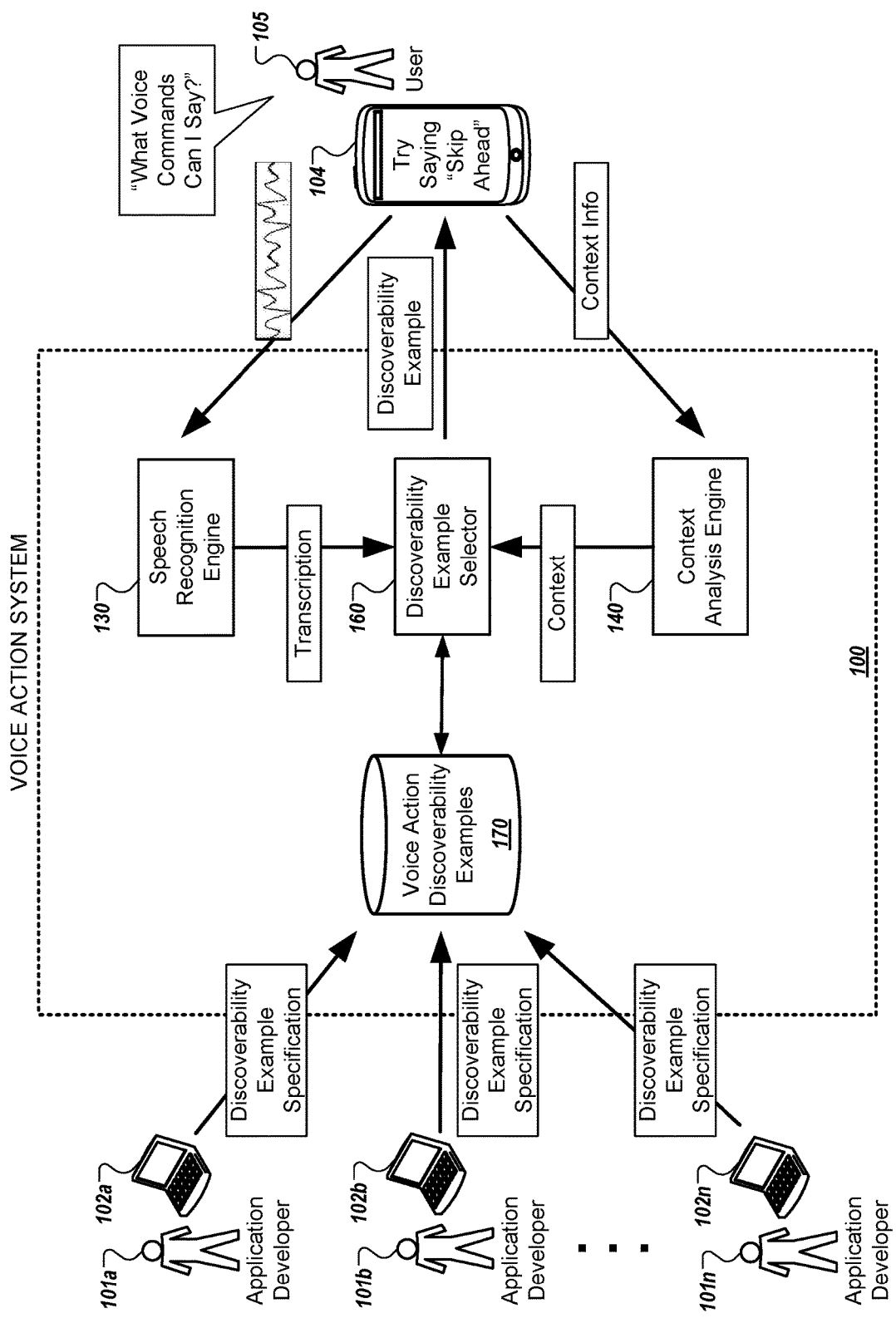

FIG. 1B depicts a voice action system 100 that enables application developers to establish discoverability examples for voice actions, and to provide appropriate discoverability examples to users. Discoverability examples submitted by an application developer may pertain to a new voice action established by the application developer for a particular application, and may be presented at user devices having the application installed to inform users how to trigger the new voice action.

As shown in FIG. 1B, the voice action system 100 receives data from terminals 102a-102n that specifies discoverability examples submitted by application developers 101a-101n. Each discoverability example submitted to the voice action system 100 by an application developer 101a-101n may pertain to a new voice action submitted by the application developer 101a-101n for a particular software application. Discoverability examples submitted by application developers can be stored at a voice action discoverability example database 170 of the voice action system 100.

For example, in some implementations, an application developer 101a-101n may submit information to the voice action system 100 to define a new voice action, as described with respect to FIG. 1A. In addition to the information defining the new voice action, the application developer 101a-101n may submit information specifying one or more discoverability examples that can inform a user of the software application how to trigger the new voice action. In some implementations, information defining a discoverability example for a new voice action can specify the new voice action to which the discoverability example relates, may specify a context when the new voice action is available to users, may specify one or more trigger terms used to trigger the new voice action, or can include other information. In some implementations, the information specifying the discoverability example submitted to the voice action system 100 by an application developer 101a-101n may include the content of the discoverability example. For instance, the information transmitted to the voice action system 100 may include a textual notification or message, an image, a video, audio data, or other content that may be provided to users to inform a user how to trigger a voice action. The application developer 101a-101n may provide information defining multiple discoverability examples for the same voice action, where different discoverability examples may be intended for presentation to different users, different types of user devices, or under different circumstances.

As an example, an application developer 101a-101n developing the "skip ahead" voice action for the media player application may submit information using a terminal 102a-102n that defines a discoverability example for the "skip ahead" voice action. To define the discoverability example for the "skip ahead" voice action, the application developer 101a-101n may submit information that specifies one or more trigger terms used to trigger the "skip ahead" voice action, as well as information that specifies a context when the "skip ahead" voice action is capable of being triggered by a user. For instance, the submitted information defining the discoverability example may specify the trigger term "skip ahead" as well as a context specifying that the voice action can be performed when the media player application is operating in the foreground of a user device and is operating in an audio player mode. Additional or different information may also be submitted by the application developer 101a-101n to establish the discoverability example. For instance, the application developer 101a-101n may submit information specifying the content of the discoverability example, such as a message "Try Saying 'Skip Ahead'" that is to be presented to users. In other examples, an application developer 101a-101n may only need to provide information specifying the new voice action for a discoverability example for that voice action to be created by the voice action system 100. In some implementations, the application developer 101a-101n may submit information defining multiple discoverability examples for the "skip ahead" voice action. For example, the application developer 101a-101n may submit information for a textual discoverability example for the "skip ahead" voice action, such as the message "Try Saying 'Skip Ahead,'" as well as information for an audio discoverability example for the "skip ahead" voice action, such as a recording of a voice saying "Try Saying 'Skip Ahead.'"

In other implementations, the voice action system 100 may suggest discoverability examples to an application developer 101a-101n, such that the application developer 101a-101n need only select from among the suggested discoverability examples. For example, when an application developer 101a-101n establishes a new voice action for an application, the voice action system 100 may be configured to generate one or more candidate discoverability examples for the new voice action. The voice action system 100 provides information to the terminal 102a-102n of the application developer 101a-101n that enables the application developer 101a-101n to select one or more discoverability examples to establish for the new voice action. Data indicating the selections of the application developer 101a-101n may then be provided to the voice action system 100 by the terminal 102a-102n.

For example, when the application developer 101a-101n submits information defining the "skip ahead" voice action as described with respect to FIG. 1A, the voice action system 100 may generate one or more candidate discoverability examples for the "skip ahead" voice action. The candidate discoverability examples may include, for example, the textual message, "Try Saying 'Skip Ahead,'" the textual message, "Say 'Skip Ahead' to Fast Forward 30 Seconds," and a recording of a voice saying "Try Saying 'Skip Ahead.'" The voice action system 100 may provide the candidate discoverability examples to a terminal 102a-102n of the application developer 101a-101n, and the application developer 101a-101n may provide input to the terminal 102a-102n to select one or more of the candidate discoverability examples. Data indicating the selections may be provided to the voice action system 100.

The voice action system 100 can receive the information specifying or selecting a discoverability example from the terminal 102a-102n of the application developer 101a-101n, and can generate data for the discoverability example based on the received information. For example, the voice action system 100 may receive the information specifying the discoverability example, and may induct the received data to generate a discoverability example in a particular data type or format. In some implementations where the voice action system 100 suggests discoverability examples to application developers 101a-101n for selection, the voice action system may generate the discoverability example, in the particular data type or format, before providing the suggestions to the application developers 101a-101n. In such an implementation, upon receiving a user selection of a particular suggested discoverability example, the voice action system 100 may be able to discard non-selected discoverability examples that the voice action system 100 generated, and may retain the selected discoverability example for storage. Alternatively, the voice action system 100 may provide discoverability examples to application developers 101a-101n without generating the discoverability examples corresponding to the suggest discoverability examples. Thus, the suggestions provided to the application developers 101a-101n may be representations of potential discoverability examples. Upon receiving selection of a particular suggested discoverability example, the voice action system 100 may then generate the discoverability example in the particular data type or format.

Inducting information specifying a discoverability example generates a discoverability example in a particular data type or format that may be necessary to presentation of the discoverability example at a user device, in a similar way that induction of the information defining a new voice action results in the generation of an intent for triggering the new voice action. For example, when an application developer 101a-101n may submit information specifying only a trigger term used to trigger a new voice action and a context when the new voice action can be triggered, the voice action system 100 may induct the information to generate an item of a particular data type or format that specifies information necessary for presentation of the discoverability example, such as the generation and formatting of a textual message to be presented to a user, information indicating devices that are compatible with the particular discoverability example, or other information required for presentation of the discoverability example at a user device.

The inducted discoverability example may be stored at the voice action discoverability example database 170. For example, the voice action discoverability example database 170 may include discoverability examples pertaining to one or more different voice actions that can be performed with respect to one or more different applications, operating systems, or devices, and the inducted discoverability example may be stored at the voice action discoverability example database 170. The voice action discoverability example database 170 may be included in the voice action system 100, or may be accessible by the voice action system 100 over one or more wired or wireless data pathways.

As shown in FIG. 1B, the voice action system 100 may also be capable of processing a request for discoverability examples received from a user device 104, and of responding to the request by providing information to the user device 104 that causes one or more discoverability examples to be presented to the user 105. For example, after the discoverability example for a new voice action has been stored at the voice action discoverability example database 170, the voice action system 100 may detect a request for discoverability examples received from the user device 104, and in response may identify discoverability examples to provide to the user device 104.

As shown in FIG. 1B, in one example the user 105 may request discoverability examples by providing the voice input "What voice commands can I say?" to the user device 104. The user device 104 may have a connection to the voice action system 100 over one or more wired or wireless data pathways, and so may transmit audio data corresponding to the voice input to the voice action system 100 where it is received by the speech recognition engine 130. The speech recognition engine 130 may generate a transcription of the voice input based on the received audio data. For example, upon receiving the audio data corresponding to the voice input of the user 105, the speech recognition engine 130 may generate the transcription "What voice commands can I say?" and may provide the transcription to a discoverability example selector 160 of the voice action system 100.

Requests for discoverability examples can be provided to the voice action system 100 in other ways as well. For example, a user device 104 may request discoverability examples from the voice action system 100 in response to a user providing an input requesting help or requesting discoverability examples, for example, by pressing a particular key or symbol at the user device 104. The user device 104 may also request discoverability examples from the voice action system 100 without requiring an explicit user input. For example, the user device 104 may determine that a new application has been launched or reopened at the user device 104 (e.g., brought to the foreground of the user device 104), or that a status of an application or of the user device 104 has changed, or that content displayed at the user device has changed, and in response to the determination may request discoverability examples from the voice action system 100.

To request discoverability examples, for example, in response to the voice input of the user 105, the user device 104 may also determine a context of the user device 104 and applications operating on the user device 104. The user device 104 may transmit contextual information to the voice action system 100, where it may be received by the context analysis engine 140. The context analysis engine 140 may process the received context information to determine a context that is relevant to identifying discoverability examples.

For example, as discussed with respect to FIG. 1A, the context analysis engine 140 may receive a variety of context information from the user device 104, and may determine a subset of the context information that is pertinent to identifying discoverability examples that should be presented to the user 105 of the user device 104. For instance, the context analysis engine 140 may receive contextual information from the user device 104 indicating that the media player application is operating in the foreground of the user device 104, that the media player application is operating in an audio player mode, and that the battery life of the user device 104 is 50%. The context analysis engine 140 may determine that the battery life information is not relevant to determining discoverability examples to present to the user 105, and therefore may provide only the context information indicating that the media player application is operating in the foreground of the user device 140 and is operating in an audio player mode to the discoverability example selector 160.

The discoverability example selector 160 may receive the transcription of the voice input of the user 104 from the speech recognition engine 130 and the relevant context from the context analysis engine 140, and based on the received information may identify one or more discoverability examples to provide to the user device 104 for output to the user 105. For example, the discoverability example selector 160 may determine, based on the transcription, that the voice input of the user 105 was a request for discoverability.

Based on determining that the voice input was a request for discoverability examples, the discoverability example selector 160 may access the voice action discoverability example database 170 to identify discoverability examples associated with contexts that satisfy the context received from the context analysis engine 140. For example, the discoverability example selector 160 may receive the context information indicating that the media player application is operating in the foreground of the user device 104 and that the media player application is operating in an audio player mode, and so may identify discoverability examples stored at the voice action discoverability example database 170 that also specify a context that includes the media player application operating in the foreground of a device and being in an audio player mode. To identify the discoverability examples, the discoverability example selector 160 may compare the context received from the context analysis engine 140 to each of the discoverability examples included in the voice action discoverability example database 170, or may compare the received context to a subset of the discoverability examples stored at the voice action discoverability example database 170. Based on the comparison, the discoverability example selector 160 may identify one or more discoverability examples to provide to the user device 104 for presentation to the user 105.

In the example shown in FIG. 1B, the discoverability example selector 160 may determine that the context specified by the discoverability example established by the application developer 101a-101n for the "skip ahead" voice action matches the context received from the context analysis engine 140. In response to this determination, the discoverability example selector 160 may transmit information to the user device 104 that causes the discoverability example for the "skip ahead" voice action to be output. For instance, the discoverability example selector 160 may transmit the inducted discoverability example for the "skip ahead" voice action, in the particular data type or format, to the user device 104, and upon receiving the inducted information the user device 104 may provide the discoverability example for the "skip ahead" voice action for output. For example, the user device 104 may receive the inducted information corresponding to the discoverability example for the "skip ahead" voice action, and the received information may control the user device 104 to display a textual notification stating "Try Saying 'Skip Ahead.'" The presentation of the "Try Saying 'Skip Ahead'" discoverability example to the user 105 can inform the user that the "skip ahead" voice action is an available voice action for the current status of the user device 104 and applications running thereon. Thus, the user 105 may subsequently provide the voice input "skip ahead," and the voice input may be processed as discussed with respect to FIG. 1A to skip ahead by a predetermined amount of time in a song that the media player application is currently playing.

In some implementations, the discoverability example selector 160 may select multiple discoverability examples for presentation at the user device 104, and may transmit information corresponding to the selected multiple discoverability examples to the user device 104. For example, the discoverability example selector 160 may determine that the context received from the context analysis engine 140 satisfies that specified by the discoverability example for the "skip ahead" voice action, as well as a discoverability for a "pause" voice action for controlling the media player application, and a "home" voice action associated with the operating of the user device 104 that causes the user device 104 to return to a home screen. The discoverability example selector 160 may provide data for each of the discoverability examples to the user device 104 such that all three of the discoverability examples is presented or available to be presented to the user 105.

Figure 1C:
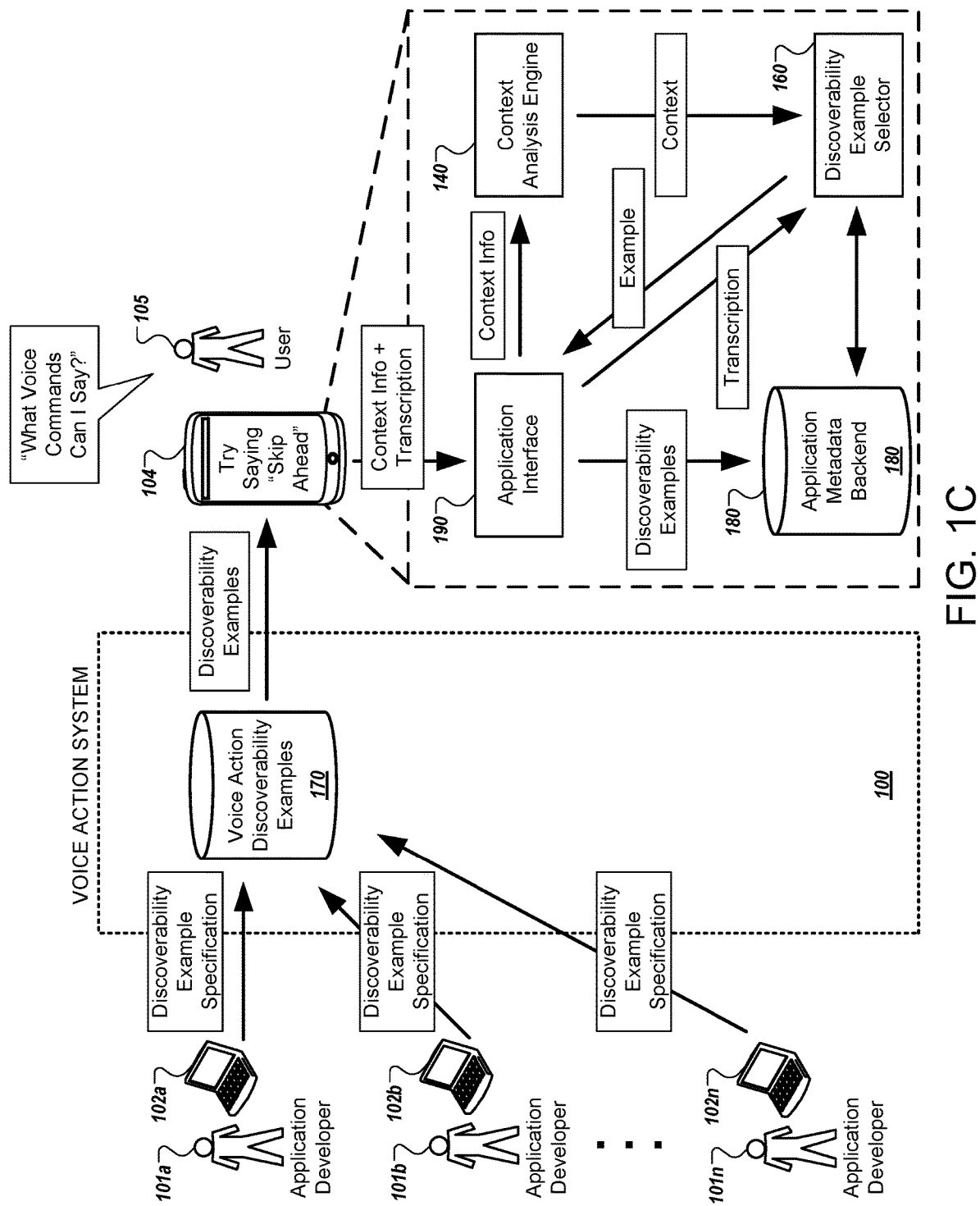

FIG. 1C illustrates a voice action system 100 that enables application developers to establish discoverability examples for voice actions, and for discoverability examples to be provided to users. As discussed below, the system of FIG. 1C performs many of the same operations discussed with respect to FIG. 1B. However, in FIG. 1C many of these operations are performed at a user device 104 as opposed to at the voice action system 100. By delegating some of the components and operations performed by the voice action system 100 in FIG. 1B to the user device 104, discoverability examples may be provided to the user 105 even if the user device 104 is offline. This implementation also reduces the needs of the user device 104 to contact the voice action system 100 each time discoverability examples are to be output at the user device 104, thereby reducing the network bandwidth used by the user device 104. The ability to provide discoverability examples without accessing a network may also reduce the power consumption incurred by providing discoverability examples, and may enable more rapid provision of discoverability examples to users.

As shown in FIG. 1C, application developers 101a-101n may each submit information specifying discoverability examples for new voice actions to the voice action system 100 using terminals 102a-102n as in FIG. 1B. The information specifying each submitted discoverability example may correspond to a voice action for a particular software application. The information submitted to the voice action system 100 for a new discoverability example corresponding to a voice action may include, for example, information specifying one or more trigger terms used to trigger the voice action, a context specified for the voice action, notification content to be presented to a user when the discoverability example is output, or other information. Alternatively, the voice action system 100 may receive information from the application developer 101a-101n for establishing a new voice action, and the voice action system 100 may generate candidate discoverability examples that the application developer 101a-101n can select from. In such an implementation, the voice action system 100 may present the candidate discoverability examples to the application developer 101a-101n at their corresponding terminal 102a-102n, and may receive information indicating the selection of one or more of the candidate discoverability examples.

Based on the received information, the voice action system 100 generates and stores discoverability examples at the voice action discoverability example database 170. The voice action discoverability example database 170 can include discoverability examples that correspond to voice actions for controlling one or more different applications, operating systems, or devices.

As shown in FIG. 1C, appropriate discoverability examples that are stored at the voice action discoverability example database 170 are provided to user devices, where they are stored at an application metadata backend that is unique to each device. For example, the user device 104 may include an application metadata backend 180 that is configured to store discoverability examples that are pertinent to the user device 104 and applications or an operating system installed on the user device 104. The user device 104 may regularly communicate with the voice action system 100 over one or more wired or wireless data pathways to identify discoverability examples that are pertinent to the user device 104, applications installed on the user device 104, and/or an operating system of the user device 104. Discoverability examples identified as being relevant to the user device 104, applications installed at the user device 104, and/or the operating system of the user device 104 can be retrieved from the voice action discoverability example database 170 and stored at the application metadata backend 180 of the user device 104.

For example, in the some implementations, the user device 104 may be equipped with an application interface 190 that is configured to receive discoverability examples stored at the voice action discoverability example database 170 that are identified as being relevant to the user device 104, applications installed at the user device 104, and/or the operating system of the user device 104. The application interface 190 may obtain the identified discoverability examples from the voice action discoverability example database 170 and may store the identified discoverability examples at the application metadata backend 180. The voice action system 100 may be configured to automatically identify discoverability examples that are relevant to the user device 104 or software installed on the user device 104, and to provide relevant discoverability examples to the user device 104. For example, the voice action system 100 may provide relevant discoverability examples to the user device 104 for storage at the application metadata backend 180 on a periodic basis, in response to user input that requests the discoverability examples be updated, in response to determining that a status of the user device 104 has changed, in response to determining that different applications or versions of applications are installed at the user device 104, in response to determining that a different operating system or version of an operating system is operating on the user device 104, or in response to other events.

In addition to storing discoverability examples at the user device 104, the system of FIG. 1C also includes, at the user device 104, components discussed with respect to FIG. 1B for presenting discoverability examples to a user 105. For example, the user device 104 shown in FIG. 1C includes a context analysis engine 140 similar to the context analysis engine 140 of FIGS. 1A and 1B, as well as a discoverability example selector 160 similar to the discoverability example selector 160 of FIG. 1B. Additionally, the user device 104 may be capable of generating transcriptions of voice inputs in a similar manner as the speech recognition engine 130 of FIG. 1B.

The application interface 190 or other component of the user device 104 may determine when discoverability examples should be provided for output at the user device 104. For example, a user 105 of the user device 104 may provide a voice input stating, "What voice commands can I use?" and the user device 104 may generate a transcription of the voice input. The application interface 190 may receive the transcription of the voice input, and may determine that the voice input is a request for discoverability examples. Alternatively, the application developer 190 may otherwise determine to provide discoverability examples for output at the user device 104. For example, the application interface 190 may determine that a user 105 has provided other input to the user device 104, such as a press and hold feature on a button of the user device 104, that requests discoverability examples for a current status of the user device 104 or an application or operating system operating on the user device 104. The application interface 190 may also determine to provide discoverability examples based on a determination that a status of the user device 104, an application installed on the user device 104, or an operating system of the user device 104 has changed. In some examples, discoverability examples may be provided at the user device 104 in response to determining that a previous voice input of the user 105 does not match any known trigger term for a voice action, to inform the user 105 of trigger terms that may be used.

Although described above as being performed by the application interface 190, in some implementations another component of the user device 104 may determine that discoverability examples should be provided for output at the user device 104. For example, as shown in FIG. 1C, a transcription of the voice input "What voice commands can I say?" can be provided to the discoverability example selector 160, and based on the transcription the discoverability example selector 160 may determine that discoverability examples should be provided for output at the user device 104. Similarly, the discoverability example selector 160 may determine to present discoverability examples at the user device 104 based on other information, such as information indicating other user input at the user device 104 or based on detecting that there has been a change in the status of the user device 104, an application installed and/or running on the user device 104, and/or an operating system of the user device 104.

When the application interface 190 determines to provide discoverability examples for output at the user device 104, the application interface may obtain contextual information for the user device 104 that indicates a status of the user device 104, one or more applications installed and/or running on the user device 104, and/or an operating system of the user device 104. Similar to the implementation discussed with respect to FIG. 1B, upon obtaining the contextual information, the application interface 190 can provide the contextual information to the context analysis engine 140 where the contextual information is processed.

The context analysis engine 140 may obtain the context information and process the information to identify a context that is relevant to identifying discoverability examples to output at the user device 104. For example, if the context analysis engine 140 receives contextual information from the application interface 190 that indicates that the media player application is presently running in the foreground of the user device 104, that the media player application is in an audio player mode, and that the battery life of the user device 104 is currently 50%, the context analysis engine 140 may determine that only the contextual information indicating that the media player application is running in the foreground and that the media player application is in an audio player mode is relevant to selecting discoverability examples to present at the user device 104. Therefore, the context analysis engine 140 may provide a context to the discoverability example selector 160 that indicates that the media player application installed on the user device 104 is operating in the foreground and is in an audio player mode, and does not indicate a battery life of the user device 104.

The discoverability example selector 160 can receive the context from the context analysis engine 140, and can use the received context to identify discoverability examples stored at the application metadata backend 180 to provide for output. For example, as discussed with respect to FIG. 1B, the discoverability example selector 160 can compare the received context with contexts specified by the discoverability examples stored at the application metadata backend 180 to identify one or more discoverability examples to provide for output. For example, the discoverability example selector 160 may identify the discoverability example for the "skip ahead" voice action based on determining that the context received from the context analysis engine 140 matches that of the discoverability example for the "skip ahead" voice action. In some implementations, the discoverability example selector 160 may identify multiple discoverability examples to provide for output at the user device 104. For example, the discoverability example selector 160 may select discoverability examples for the "skip ahead" voice action, a "pause" voice action for controlling the media player application, and a "home" voice action for controlling the user device 104 to return to a home screen.

The discoverability example selector 160 can provide the selected discoverability examples for output at the user device 104. For example, the discoverability example selector 160 may be able to provide the selected discoverability examples for output via the application interface 190. As shown in FIG. 1C, for instance, the selected discoverability example for the "skip ahead" voice action may be output at the user device 104, thereby causing the textual notification "Try Saying 'Skip Ahead'" to be output at a display of the user device 104.

Figure 2:
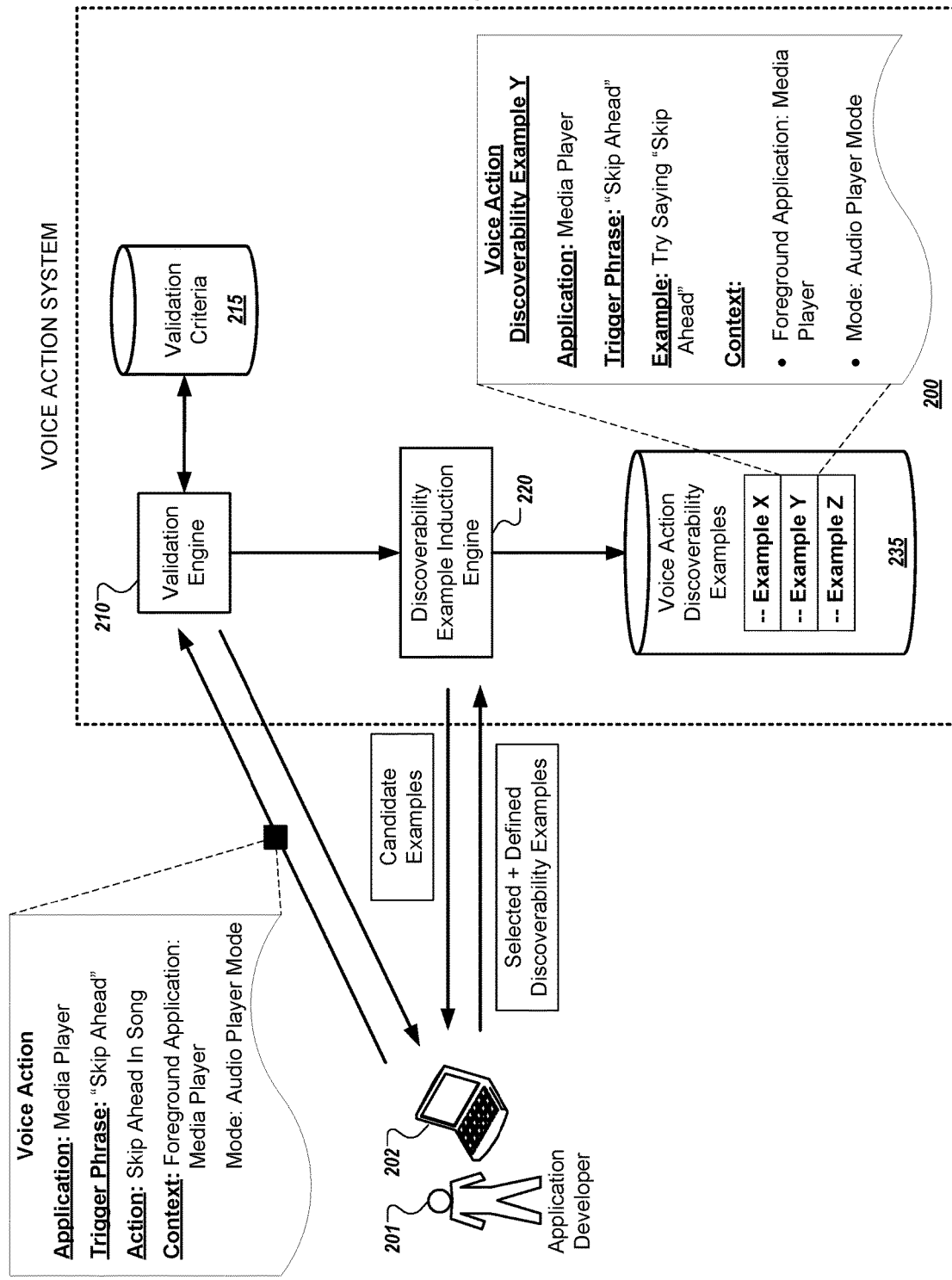
FIG. 2 depicts an example system for generating discoverability examples for voice actions using a voice action development system and service.

FIG. 2 depicts an example voice action system 200 that is configured to enable the establishment of voice actions and discoverability examples for voice actions. Briefly, the voice action system 200 includes a validation engine 210 that has access to validation criteria 215, a discoverability example induction engine 220, and a voice action discoverability example database 235 that is configured to store discoverability examples. The voice action system 200 may operate as a platform offering a service or tool that enables an application developer 201 to establish voice actions and discoverability examples for those voice actions via a terminal 202. In some implementations, the application developer 201 may establish voice actions according to the methods disclosed in U.S. patent application Ser. No. 15/057,453, filed Mar. 1, 2016, which is hereby incorporated by reference in its entirety.

As shown in FIG. 2, the application developer 201 may submit information to the voice action system 200 to define a new voice action. In some examples, the information defining the voice action may be submitted as a grammar in a format that can be processed by the voice action system 200 to generate an intent for the voice action. For example, the application developer 201 may enter information at the terminal 202 that specifies that a new voice action is to be established for the media player application. The application developer 201 may specify that the new voice action uses the trigger phrase "skip ahead" to control the media player application to skip ahead by a predetermined amount of time in a song that the media player application is currently playing. The application developer 201 may further specify a context for the "skip ahead" voice action such that the "skip ahead" voice action is only capable of being triggered when the media player application is operating in the foreground of a user device, and only when operating in an audio player mode. The information submitted by the application developer 201 may be in the form of a grammar that is capable of being processed by the voice action system 200, or the information submitted by the application developer 201 may be converted into a grammar format for submission to the voice action system 200.

The information defining the new voice action can be submitted to the voice action system 200 by the terminal 202 over one or more wired or wireless data pathways. The voice action system 200 can receive the information defining the new voice action at a validation engine 210 that is configured to validate new voice actions submitted by application developers. For example, the validation engine 210 may receive a grammar defining a new voice action that has been submitted by the application developer 201. To validate the new voice action, the validation engine 210 may access one or more validation criteria 215 that can include one or more rules associated with defining a new voice action. The validation engine 210 may evaluate the information defining the new voice action in view of the accessed validation criteria 215.

For the example "skip ahead" voice action shown in FIG. 2, the validation engine 210 may determine whether the media player application is an existing application, such that new voice actions can be created for the specified application. The validation engine 210 may access a rule that specifies that a trigger phrase must be more than one spoken syllable in length, and may validate the trigger phrase "skip ahead" based on determining that the trigger phrase "skip ahead" is longer than one spoken syllable. The validation rules may specify a list of possible actions that the media player application can perform, and may validate the specified action to skip ahead by a predetermined amount of time in a song that the media player application is currently playing based on determining that the media player application can skip ahead by a predetermined amount of time in a song currently playing in the application. The validation engine 210 may validate the context specified by the grammar to ensure that the context does not contain contradictions. For example, the validation engine may ensure that the specified context does not require the application to be operating in the foreground and also operating in the background for the new voice action to be enabled, since only one of those two conditions can be satisfied. Other validation criteria 215 may be applied to information defining a new voice action to determine whether the new voice action submitted by the application developer 201 is valid and can be inducted to generate an intent for the new voice action.

Other forms of validation may be performed by the validation engine 210. For instance, the validation engine 210 may determine whether the application developer 201 is authorized to generate new voice actions for the specified application, may determine whether a fee required to generate the new voice action has been paid, or may otherwise determine whether a grammar submitted by an application developer 201 may result in the creation of an intent for the new voice action.

Based on determining that the grammar or other information defining the new voice action submitted by the application developer 201 is valid, the voice action system 200 can induct the information defining the new voice action to generate an intent for the new voice action as discussed with respect to FIG. 1A. The generated intent can be stored at a voice action database similar to the application voice action database 110, where the voice action may then be deployed by the application developer 201 to enable the application for users having the application installed on their user devices. For example, the grammar or other information defining the "skip ahead" voice action may be inducted by the voice action system 200 to generate an intent for the "skip ahead" voice action, and the intent for the "skip ahead" voice action may be stored at an application voice action database. The application developer 201 may deploy the "skip ahead" voice action to enable the "skip ahead" voice action for users who have the media player application installed on their user devices.

As shown in FIG. 2, in addition to generating an intent for the new voice action, the voice action system 200 may also induct the information defining the new voice action to generate one or more candidate discoverability examples for the new voice action. For example, the validated information defining the new voice action may be submitted to the discoverability example induction engine 220, and the discoverability example induction engine 220 can induct the information defining the new voice action to generate one or more candidate discoverability examples for the new voice action.

In some implementations, the discoverability example induction engine 220 may induct the information defining the new voice action to generate one or more candidate discoverability examples. The candidate discoverability examples may be in a format that, when provided to a user device, can control or enable the user device to provide a notification specified by the discoverability example to be output at the user device. For example, inducting the data defining the voice action may result in the generation of a particular data item or data item in a particular format that, when received by a user device or triggered at a user device controls the user device to present a textual, image, video, audio, or other notification for output to inform a user of the device of trigger terms that can be used to trigger the associated voice action at the user device.

In some implementations, inducting the data defining the new voice action to generate a candidate intent can include generating one or more textual phrases, spoken audio phrases, images, or videos that specify a trigger phrase for triggering the associated voice action. For example, the discoverability example induction engine 220 may receive the data indicating the trigger phrase for the new voice action, and may generate one or more candidate phrases corresponding to one or more candidate discoverability examples. In the example shown in FIG. 2, the discoverability example induction engine 220 may generate candidate phrase such as "Try Saying 'Skip Ahead'," "Say 'Skip Ahead' to Fast Forward 30 Seconds," "Say, 'Okay Computer, Skip Ahead," or any number of other candidate phrases. The discoverability example induction engine 220 may also generate, as candidate notifications for candidate discoverability examples, spoken versions of the candidate phrases, candidate images that indicate the trigger phrase "skip ahead" associated with the new voice action, or candidate videos that indicate the trigger phrase "skip ahead."

In some implementations, a trigger phrase for a voice action may include one or more placeholders, such as one or more enumerated types, and the discoverability example induction engine 220 may generate candidate discoverability examples associated with notifications that include the placeholders. For example, a voice command may be associated with the trigger phrase, "add % CurrentSong to favorites," where "% CurrentSong" is a placeholder that refers to a song that is currently playing in the media player application. The discoverability example induction engine 220 may generate a candidate discoverability example that includes a phrase, "Try Saying, 'Add % CurrentSong to Favorites'," where the placeholder may be replaced by a name of a song currently playing in the media player application when the phrase is provided for output.

In some implementations, the candidate discoverability examples generated by the discoverability example induction engine 220 also each specify the context when the new voice action is capable of being triggered, such that the discoverability examples for the new voice action are only capable of being output at a user device when a status of the a user device, application running on the user device, or operating system of the user device matches the context specified by the corresponding voice action. In this way, discoverability examples provided to users in any particular situation are limited to discoverability examples for voice actions that can be triggered at that time.

As discussed previously, a context specifies one or more conditions that must be satisfied for a voice action to be enabled, i.e., such that the voice action will not be triggered by a trigger phrase associated with the voice action unless the context is also satisfied. The application developer 201 can define a context as have one or more different requirements or conditions.

In some instances, a context may require a certain status of a user device, or may require a user device to have certain attributes. For instance, a context may specify whether the user device is powered on or locked, or whether the user device has a camera, gyroscope, barometer, or other component or feature. Thus, for example, a voice action to take a picture using an application installed on a user device may not be enabled if contextual information received from the user device indicates that the user device does not have a camera.

In other examples, a context may require that specific applications are operating in the foreground or background of a user device. For example, as shown in FIG. 2, the "skip ahead" voice action may only be enabled when the media player application is operating in the foreground of user device 204, but not if the media player application is closed or is operating in the background of the user device 204. In other examples, a voice action may be defined with a context that enables the voice action when an application is operating in the background. For instance, a social network application may have an associated voice action to accept a request to connect with another user, and a user may be able to trigger the voice action to accept a request to connect with another user even if the social network application is only operating in the background of the user device.

A context may additionally or alternatively require that a particular application is operating in a specific mode for a voice action to be enabled. A mode may be a particular activity or task that the application is executing. For example, an email application may be determined to be in an email write mode, a media player application may be in an audio player mode, or a camera application may be in a camera mode or a photo album viewer mode. The user device may be able to determine which of the modes a particular application is operating in, and may include that information in context information that is used to determine whether a particular voice action is enabled.

Additionally, in some instances, a context may require that an application mode has a certain status. For example, a context may indicate that a voice action to "pause" a movie may only be enabled when a media player application is in a movie player mode and when the status of the application in the movie player mode is that the application is currently playing the movie. In some instances, a user device may not be able to determine the status of an application operating in a particular mode. In those instances, it may be necessary to configure the application to provide information indicating the status of the application in a particular mode. Thus, specifying such a condition in a context for a particular application may require modifications to the application itself, in order for context information provided by the user device to include the required status information.

In some examples, a context specified for a voice action may require that particular objects or types of objects are displayed on a screen of a user device to enable the voice action. For example, a context may specify that a "save image" voice action is only enabled if an image is being output at the display of the user device, or may specify that a "highlight" voice action is only available if text is presented on the display. In another example, a voice action to select a particular item in a list, such as the voice action to "pick the first one" may only be available if context information indicates that a number "1" or a bullet point is being presented on the display of the user device, or if there is a list of items being presented on the display. In some instances, the user device may not be capable of determining what information is being presented at its display at a given moment, e.g., when an application is in control of the display. Thus, if a context specifies that certain information or types of information must be output at the display for a voice action to be enabled, then it may be necessary to modify the application to provide that information. The user device can then include the information indicating what is being output at the display of the user device in contextual information that is used to determine whether a specific voice action should be enabled.

In other instances, a context may require that a notification or a particular type of notification has been output at a user device. For example, an email application that provides pop-up notifications to users when a new email is received may have an associated voice action to "read email" that is enabled when a new email notification is being output to the display of a user device by the application. Thus, context information may indicate whether a notification is being output to the display of the user device, and that information may be used in determining whether the "read email" voice action should be enabled.

In some examples, a context may require a user device be in a particular geographic location for a voice action to be enabled. A user device may be capable of determining its geographic location using cellular tower triangulation, based on accessing an internet connection that is associated with a particular geographic location, using Global Positioning System (GPS) technology, or using other means. The user device may include information indicating its geographic location in context information, and a voice action may be enabled based on the geographic location satisfying a context's geolocation requirements. As an example, a context associated with a voice action for a retailer's application may specify that a certain voice action should only be processed if a user device having the retailer application is within a range of one of the retailer's stores. The voice action for the retailer application may be enabled based on context information from the user device indicating that the geographic location of the user device corresponds to a geographic location that is within the range of one of the retailer's stores.

A context defined by an application developer can also indicate that a voice action associated with the context is only enabled during certain times, dates, months, seasons, or when other temporal conditions are met. For example, a context may specify that a certain voice action is only enabled if context information received from a user device or from another information source satisfies a time condition. For example, a voice action for a banking application may be associated with a context that includes a temporal condition, such that the voice action is only enabled if context information indicates that a time when the voice action is submitted is between 6:00 AM and 10:00 PM.

A context may specify other requirements for enabling a voice action to be triggered. For example, the voice action system 200 may have access to information from sources other than a user device, or may be able to receive information from a user device that is obtained from one or more information sources. The information received from the other sources can be required context information for enabling a voice action. Such information can include, for example, weather information, emotional information for a user, news information, stock market information, or other information. For instance, the voice action system 200 may be capable of accessing other information sources through one or more wired or wireless network connections, e.g., an Internet connection or other network connection to a server system. A context for a voice action may specify that the voice action is enabled only if weather information for a geographic area corresponding to the location of a relevant user device indicates that it is raining in that location. To check whether the context condition is met, the voice action system 200 may be able to access weather information for a known location of a user device over the one or more network connections.

In some implementations, the discoverability example induction engine 220 can generate multiple versions of a candidate discoverability example corresponding to different operating systems, different types of user devices, or different versions of an application. Because one particular data type or format may not be used to output a discoverability example at all types of devices, operating systems, or versions of an application, the discoverability example induction engine 220 may generate multiple versions of a discoverability example. Thus, correct versions of a discoverability example can be provided to different user devices to ensure proper output of the discoverability example at those user devices. Additionally or alternatively, in some implementations a discoverability example may be modified for provision at different user devices, operating systems, or versions of an application. For example a generated discoverability example may include an image notification in one format, e.g., using a particular size, resolution, color map, etc., and the image notification may be capable of being modified or formatted for presentation at different types of user devices, in different operating systems, or within different versions of an application.

In some implementations, candidate discoverability examples can be presented to the application developer 201 for selection. For example, upon generating candidate discoverability examples for a new voice action submitted by the application developer 201, the voice action system 200 may provide information to the terminal 202 of the application developer 201 that enables the application developer 201 to select specific discoverability examples that they would like to implement for the new voice action. In the example shown in FIG. 2, the discoverability example induction engine 220 may present information at the terminal 202 indicating the candidate phrases "Try Saying 'Skip Ahead'," "Say 'Skip Ahead' to Fast Forward 30 Seconds," and "Say, 'Okay Computer, Skip Ahead," and the application developer 201 may select one or more of the candidate phrases. For example, the application developer may select the candidate phrase "Try Saying 'Skip Ahead," indicating that they would like a discoverability example for the "skip ahead" voice action to be a textual notification that is output to a user that says "Try Saying 'Skip Ahead."

Additionally or alternatively, the application developer 201 may submit information defining discoverability examples for a voice action. For example, as discussed with respect to FIGS. 1B and 1C, the application developer 201 may submit information to the voice action system 200 that defines a discoverability example for a voice action. The submitted information defining the discoverability example may specify the voice action to which the discoverability example pertains, such as information specifying the "skip ahead" voice action, may specify a context when the discoverability example should be available for output at user devices, such as the context specified for the "skip ahead" voice action, and may submit content for a notification that includes the trigger term to be presented as the discoverability example for the voice action. In the example shown in FIG. 2, the application developer 201 may submit information to the voice action system 200 that specifies the "skip ahead" voice action, a context that the discoverability example for the "skip ahead" voice action should only be available for output when the media player application is operating in the foreground and is in an audio player mode, and may submit an audio clip stating "Try Saying 'Skip Ahead'" to the voice action system 200. Other content may be submitted by the application developer 201, such as a textual phrase, image, video, or other content that can be provided for output at a user device to inform a user of the device that the voice action to skip ahead by a predetermined amount of time in a song that the media player application is currently playing can be triggered by providing a voice input that states "skip ahead." In some examples, less, additional, or different information may be required from the application developer 201 to specify a discoverability example. For instance, the application developer 201 may only be required to submit information indicating the voice action and content to be output as a notification associated with the discoverability example.

The voice action system 200 can receive the data indicating the candidate discoverability examples selected by the application developer 201, and can store the selected candidate discoverability examples at a voice action discoverability example database 235. The voice action system 200 can also receive data defining one or more discoverability examples defined by the application developer 201, can induct the data defining the one or more discoverability examples to generate data items in the proper discoverability example format, and can store the discoverability examples generated by the induction process at the voice action discoverability example database 235.

For example, based on receiving data indicating a selection of the discoverability example including the textual phrase, "Try Saying 'Skip Ahead'," the voice action system can store the discoverability example at the voice action discoverability example database 235. As shown in FIG. 2, the stored discoverability example can be a particular data item or data in a particular format named "Example Y" that specifies the "skip ahead" voice action, the trigger phrase "skip ahead" for the voice action, the notification "Try Saying 'Skip Ahead'" that is provided for output when the discoverability example is triggered, and the context when the discoverability example is available for output requiring that the media player application is operating in the foreground and is in an audio player mode.

Similarly, a discoverability example defined by the application developer 201 can be inducted to generate an item of data in a particular format for the discoverability example. In some examples, the discoverability example defined by the application developer 201 may be inducted to generated one or more versions of the discoverability example, such as versions of the discoverability example that correspond to different versions of the application to which the voice action relates, different devices, or different operating systems. The one or more discoverability examples generated during the induction process performed by the discoverability example induction engine 220 can be provided and stored at the voice action discoverability example database 235. For example, a discoverability example defined by the application developer 201 and inducted to generate a discoverability example can be stored at the voice action discoverability example database 235 as "Example X."

The voice action discoverability example database 235 can store multiple discoverability examples that correspond to one or more voice actions for one or more applications. For example, the voice action discoverability example database 235 may include multiple discoverability examples for each of multiple different voice actions that have been developed for multiple different applications, devices, or operating systems. The voice action discoverability example database 235 may be a structured table, such as a look-up table, a linked list, a graph comprising nodes and edges between nodes, or may be any other data structure capable of storing discoverability examples such that discoverability examples can later be identified and provided for a proper status of a user device, operating system, or application. In some instances, each discoverability example in the voice action discoverability example database 235 may be associated with information specifying the application to which the discoverability example pertains, a version of the application that the discoverability example is compatible with, a device or devices that the discoverability example is compatible with, an operating system or operating systems that the discoverability example is compatible with, or other information pertinent to selecting a particular discoverability example, such that appropriate discoverability examples can be identified in the voice action discoverability example database 235 without having to parse the data included in the discoverability example itself for such information. Such an arrangement may enable faster identification of appropriate discoverability examples to provide for output.

The discoverability examples stored in the voice action discoverability example database 235 can be provided to user devices to control or enable the user devices to output discoverability examples. For instance, in the implementation of FIG. 1B, one or more discoverability examples stored in the voice action discoverability example database 235 can be provided to a user device for output in response to receiving a request for discoverability examples from the user device. Or, as shown in the implementation of FIG. 1C, one or more of the discoverability examples in the voice action discoverability example database 235 can be provided to a user device and stored at the user device, such that they may subsequently be triggered for output at the user device.

In some implementations, before a discoverability example is capable of being provided for output at a user device, the application developer 201 may be capable of testing a new discoverability example and after approving of the discoverability example may deploy the discoverability example to enable the discoverability example to be provided for output at a user device. For example, the application developer 201 may be capable of testing or performing a test at the terminal 202 in which the application developer 201 may be shown an example of how the discoverability example will be provided for output at a user device, such as how a notification of the discoverability example will appear at a display of a user device or will sound when played by a user device. In some implementations, the application developer 201 may designate one or more other user devices separate from the terminal 202 where the discoverability example can be tested, to determine how the discoverability example appears or sounds when presented at different user devices. If the application developer 201 approves of the discoverability example, the application developer 201 may provide input at the terminal 202 to deploy the discoverability example, thereby enabling the discoverability example to be output at user devices. Additionally, in some implementations, the application developer 201 may be capable of rescinding deployment of the discoverability example, such that the discoverability example is no longer capable of being provided for output at user devices.

Figure 3:
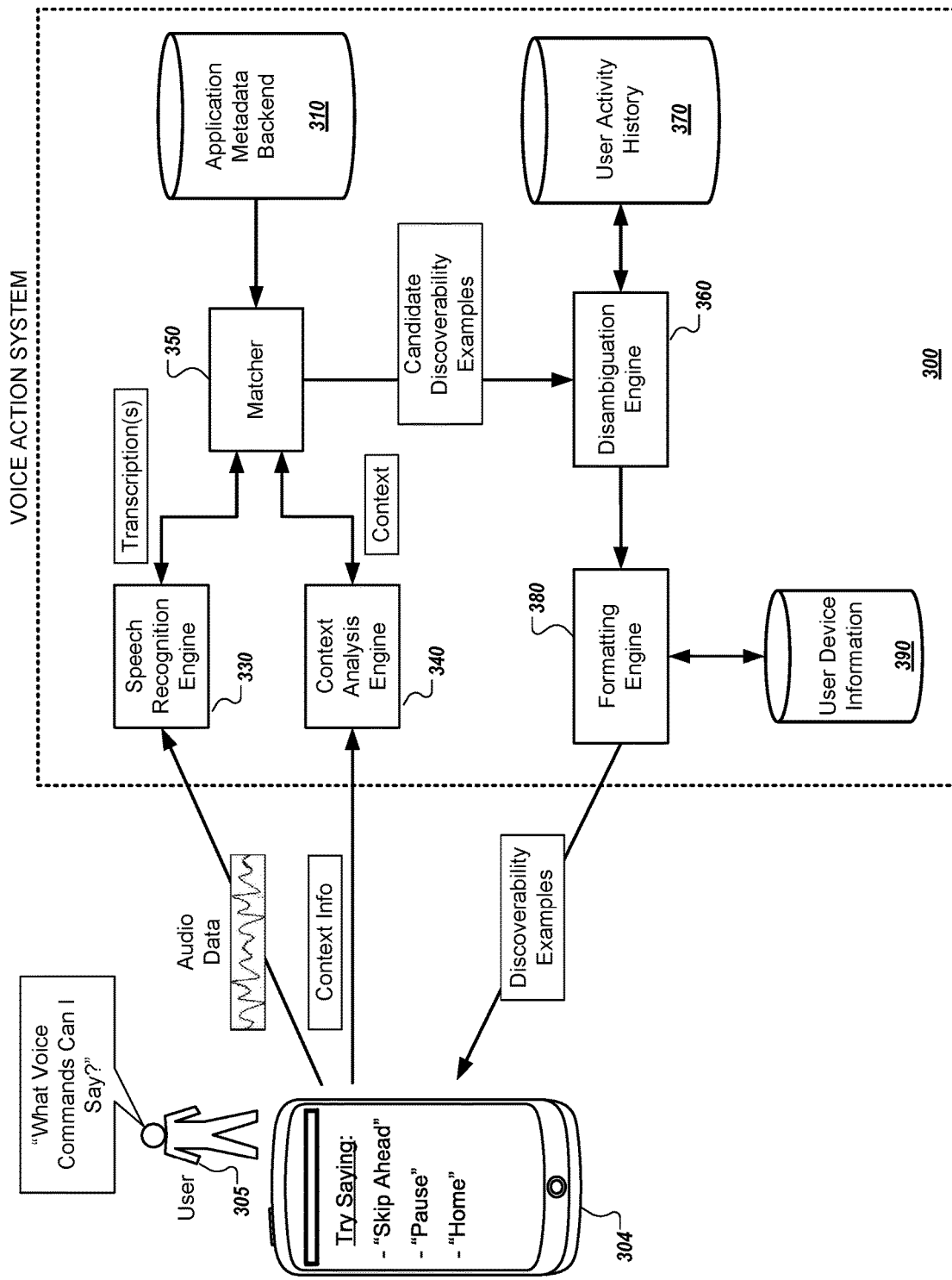
FIG. 3 depicts an example system for providing discoverability examples for voice actions.

FIG. 3 depicts a voice action system 300 that is configured to present discoverability examples at a user device 304 to inform a user 305 of the user device 304 of trigger phrases that can trigger voice actions. In some implementations, the voice action system 300 can be included in the user device 304, such that the user device 304 can provide discoverability examples for output to the user 305 without communicating with another system. In other examples, the voice action system 300 may be separate from the user device 304, and the user device 304 may communicate with the voice action system 300 over one or more wired or wireless data pathways when providing discoverability examples for output.

Briefly, the voice action system 300 can include a speech recognition engine 330 similar to the speech recognition engine 130 of FIGS. 1A and 1B, a context analysis engine 340 similar to the context analysis engine 140 of FIGS. 1A to 1C, a matcher 350, a disambiguation engine 360, and a formatting engine 380. The matcher 350 may have access to an application metadata backend 310 that includes one or more discoverability examples that are capable of being provided for output at the user device 304. The disambiguation engine 360 may have access to a user activity history 370 that includes information indicating past operations performed at the user device 304. Additionally, the formatting engine 380 may have access to user device information 390 that indicates information relevant to the formatting of a discoverability example for output at the user device 304. In some implementations, such as when the voice action system 300 is included in the user device 104, the voice action system 300 may include an application interface (not shown) similar to the application interface 190 of FIG. 1C.

Discoverability examples may be provided for output at the user device 304 in response to determining that the user 305 has requested discoverability examples or in response to determining that a condition associated with providing discoverability examples for output has been met. For example, as shown in FIG. 3, the user 305 may provide the voice input "What voice commands can I say?" to the user device 304. Audio data corresponding to the voice input may be provided to the speech recognition engine 330, and a transcription "What voice commands can I say?" may be generated based on the audio data. The transcription "What voice commands can I say?" may be interpreted, for example, by the matcher 350 of the voice action system 300, as a request for discoverability examples.

In other instances, different user input, such as different voice inputs, a selection of a "help" button, a press-and-hold input at a control of the user device 304, or other user inputs may result in the voice action system determining to provide discoverability examples for output at the user device 304. In still other instances, other information cause the voice action system 300 to determine to provide discoverability examples, such as information indicating that a status of the user device 304, an application operating on the user device 304, or an operating system of the user device 304 has changed. In some examples, discoverability examples may be provided for output at the user device 304 based on determining that the user 305 has provided a voice input to the user device 304 that does not match any particular voice action trigger phrase. In such an example, discoverability examples provided to the user 305 may be selected based on determining that the discoverability examples may correspond to an action that the user 305 intended to perform at the user device 304.

Based on determining to provide discoverability examples for output at the user device 304, contextual information indicating a status of the user device 304, one or more applications installed on user device 304, or an operating system of the user device 304 can be provided to the voice action system 300. For example, the voice action system 300 may determine to provide discoverability examples for output at the user device 104, and in response may obtain contextual information. In other implementations, the voice action system 300 may determine to provide discoverability examples at the user device 304 in response to receiving contextual information. For example, the voice action system 300 may determine to provide discoverability examples for output at the user device 304 in response to one or more hardware components of the user device 304, one or more applications installed on the user device 304, or an operating system of the user device 304 providing information to the voice action system 300 indicating their status. In some implementations, the voice action system 300 may obtain or be provided with contextual information at regular intervals or continuously.

The contextual information can be received by the context analysis engine 340, where the context analysis engine 340 may process the contextual information to determine a relevant context. For example, as discussed previously, the context analysis engine 340 can receive contextual information that indicates a status of numerous components of the user device 304, numerous applications installed on the user device 304, or one or more operating systems operating on or associated with the user device 304. The context analysis engine 340 can determine a relevant context of the user device 304 from the received information. The context analysis engine 340 may filter unnecessary contextual information to get the relevant context, can interpret the received contextual information to determine a relevant context, or can otherwise use the received contextual information to determine a relevant context.

For the example shown in FIG. 3, for instance, the context analysis engine 340 may receive contextual information that indicates that the media player application is operating in the foreground of the user device 304, that the media player application is operating in an audio player mode, and that a battery life of the user device 304 is 50%. The context analysis engine 340 may filter out the battery life contextual information to generate a relevant context that indicates only that the media player application is operating in the foreground and is in an audio player mode. In another example, the context analysis engine 340 receives contextual information indicating that the media player application is operating in the foreground of the user device 304, that a headphone jack of the user device 304 is providing output, and that a display of the user device 304 is currently dimmed. The context analysis engine 340 may interpret the received contextual information to determine a relevant context. For instance, the context analysis engine 340 may determine that the media player application operating in the foreground is likely in an audio player mode, since the headphone jack is providing sound output while the display is dimmed.

The relevant context determined by the context analysis engine 340 is provided to the matcher 350, where the matcher 350 identifies discoverability examples that may be provided for output at the user device 304 given the current status of the user device 304, applications installed on the user device 304, or an operating system of the user device 304. The matcher 350 may select those discoverability examples that are associated with contexts that match the relevant context determined by the matcher 350. To determine discoverability examples that match the relevant context received from the context analysis engine 340, the matcher 350 compares the relevant context to contexts specified by one or more discoverability examples stored in the application metadata backend 310. For example, as discussed with respect to FIG. 2, the application metadata backend 310 may store numerous discoverability examples that may be associated with numerous voice actions pertaining to numerous different applications, devices, or operating systems. Each discoverability example in the application metadata backend 310 may specify a context indicating when the corresponding voice action is available to be triggered, which also defines when the discoverability example is available to be provided for output at a user device. By comparing the received context with the contexts specified by the discoverability examples in the application metadata backend 310, the matcher 350 identifies a set of candidate discoverability examples that are eligible to be provided for output at the user device 304.

In the example shown in FIG. 3, for instance, the matcher 350 may compare the context indicating that the media player application is operating in the foreground and is in an audio player mode to multiple discoverability examples stored in the application metadata backend 310. Based on the comparison, the matcher may identify a set of four discoverability examples that correspond to voice actions that can be triggered by a user given the present context. These discoverability examples may include, for example, a discoverability example for the "skip ahead" voice action, a discoverability example for a "pause" voice action for controlling the media player application to pause a song playing in the audio player application, a discoverability example for a "search for similar songs" voice action that controls the media player application to search a database or the Internet for songs that are determined to be similar to a song currently playing in the media player application, and a discoverability example for a "home" voice action that controls the user device 304 to return to a home screen of the user device 304 (e.g., a desktop or menu screen that the operating system presents to users at a display of the user device 304).

The matcher 350 can identify the candidate discoverability examples and can provide the candidate discoverability examples to the disambiguation engine 360. In some implementations, providing the candidate discoverability examples to the disambiguation engine 360 may require sending data items corresponding to the candidate discoverability examples to the matcher 350. In other implementations, the disambiguation engine 360 may be capable of accessing the candidate discoverability examples at the application metadata backend 310, such that the matcher 350 need only provide information to the disambiguation engine 360 that identifies the candidate discoverability examples, without needing to send the items of data corresponding to the candidate discoverability examples to the disambiguation engine 360. In some examples, identifying a candidate discoverability example includes identifying one or more versions of the candidate discoverability example as candidate discoverability examples. For example, the "skip ahead" voice action may be associated with multiple discoverability examples that each specify a context corresponding to the context received from the context analysis engine 340, such as a textual notification discoverability example and a spoken word audio notification discoverability example, and both the textual and spoken word audio notifications may be provided or identified to the disambiguation engine 360.

The disambiguation engine 360 can receive the candidate discoverability examples or information identifying the candidate discoverability examples from the matcher 350, and can select one or more discoverability examples from among the candidate discoverability examples to provide for output to the user device 304. In some implementations, the disambiguation engine 360 may select discoverability examples from among the candidate discoverability examples based on details of a user activity history 370, based on the capabilities of the user device 304 to present discoverability examples, or based on the status of the user device 304. The number of discoverability examples selected by the disambiguation engine 360 can depend on, for example, the type of discoverability examples that to be presented to a user, e.g., whether the discoverability examples output to the user 305 are textual, images, audio, video, etc. The number of discoverability examples selected may also depend on the capabilities of the user device 304, for example, based on a display size of the user device 304 that could be a limiting factor in the quantity of textual or image notifications that can be presented at the user device 304. Other factors may influence the selection of discoverability examples by the disambiguation engine 360. For example, in some implementations, the disambiguation engine may receive information indicating user preferences for the number of discoverability examples to be displayed, a size of a display of the user device 304, or other information, and the received information may affect the specific discoverability examples selected or the number of discoverability examples selected by the disambiguation engine 360.

For example, the disambiguation engine 360 may have access to a user history 370 that indicates operations previously performed at the user device 304, and the disambiguation engine 360 may select discoverability examples to provide for output based on the user history 370. In some implementations, the user history 370 may indicate operations previously performed at the user device 304 in the media player application, operations previously performed at the user device 304 when a status of the user device 304 matches the current context, when a status of the media player application matches the current context, when a user has requested discoverability examples indicating available voice actions, or may otherwise indicate a history of user operations performed at the user device 304. The disambiguation engine 360 may rely upon the user history 370 to identify discoverability examples to provide for output at the user device 304. For example, the disambiguation engine 360 may determine that a user has previously skipped ahead (e.g., fast forwarded) in a song previously while operating the media player application in the foreground and in an audio player mode, and may therefore select the discoverability example for the "skip ahead" voice action as a discoverability example to be output at the user device 304.

The disambiguation engine 360 may otherwise utilize the user activity history 370 in selecting discoverability examples from among the candidate discoverability examples identified by the matcher 350. For example, the disambiguation engine 360 may access the user activity history 370, and may determine to select a particular candidate discoverability example based on the user activity history 370 indicating that a user has previously performed a voice action corresponding to the particular candidate discoverability example, may determine not to select a particular candidate discoverability example based on the user activity history 370 indicating that a user has previously performed a voice action corresponding to the particular candidate discoverability example, may determine to select the particular candidate discoverability example based on determining that a user has previously or recently entered voice input that is similar to a trigger phrase associated with the particular candidate discoverability example, may determine to select a particular candidate discoverability example based on determining that a user has performed operations previously at the user device 304 that matches an action that the particular candidate discoverability example is associated with, or the disambiguation engine 360 may otherwise utilize the user activity history 370 in the selection of particular candidate discoverability examples.

In some implementations, the disambiguation engine 360 may utilize other available information to select discoverability examples. For example, the disambiguation engine 360 may have access to information about the user device 304, such as user device information 390, or a status of the user device 304, such as contextual information received from the user device 304, and may select discoverability examples based on the available information. For instance, the disambiguation engine 360 may access information indicating that the user device 304 does not have a display, and therefore the disambiguation engine 360 may select only audio discoverability examples, since textual, image, or video discoverability examples cannot be effectively provided for output at the user device 304. Alternatively, if the disambiguation engine 360 accesses information indicating that the user device 304 has a display and is currently in a "silent" mode, the disambiguation engine 360 may select candidate discoverability examples that are textual or image discoverability examples, and not audio or video discoverability examples since audio for those discoverability examples may not be output while the user device 304 is in "silent" mode. The disambiguation engine 360 may rely on other information, such as user preferences that indicate the preferences of the user 305 to receive discoverability examples of a certain type, in selecting from among the candidate discoverability examples.

In some implementations, the disambiguation engine 360 may select from among the candidate discoverability examples based on the accessed information, such as user activity history 370, based on assigning a ranking or relevance score to the candidate discoverability examples. For instance, the disambiguation engine 360 may use the accessed information to rank the discoverability examples according to their perceived relevance to the status of the user device 304, an expected intent of the user 305, or other criteria, and may select from among the candidate discoverability examples based on the ranking. Additionally, in some implementations, one or more discoverability examples may be discoverability examples that are always presented to users at the user device 304. For example, a discoverability example for a "back" voice action that controls the user device 304 to return to previous screen may always be selected for output, or may always be selected for output when a particular context associated with the "back" voice action is satisfied.

In some implementations, the disambiguation engine 360 may select different groups of candidate discoverability examples that may be provided for output at the user device 304 in different ways. For instance, the disambiguation engine 360 may identify some candidate discoverability examples to be output as audio notifications, and other candidate discoverability examples to be output as textual notifications. In some examples, the disambiguation engine 360 may determine that some discoverability examples should be output to a primary discoverability example window or pane of a user interface displayed at the user device 304, and may select other candidate discoverability examples to include in a drop down menu, in a "view more" area of the user interface, or in other separate regions of a user interface.

The selected candidate discoverability examples or information identifying the selected discoverability examples may be transmitted to the formatting engine 380, where the formatting engine 380 can format the selected discoverability examples for output at the user device 304. For example, the formatting engine 380 may have access to user device information 390 that indicates characteristics of the user device 304 that are pertinent to presenting discoverability examples at the user device 304, and may prepare the discoverability examples for output at the user device 304 based on the user device information 390. User device information 390 can include, for example, a display size, resolution, color spectrum, refresh rate, or other parameters, an audio output frequency range or other speaker or headphone jack output parameters, application programming interface protocols or input/output formats, or other information relevant to provide discoverability examples for output at the user device 304.

The formatting engine 380 can receive or access the candidate discoverability examples selected by the disambiguation engine 370 and can format the selected candidate discoverability examples for output at the user device 304. For example, the formatting engine 380 may receive the selected candidate discoverability example data items, or can access the selected candidate discoverability examples at the application metadata backend 310, and based on formatting the selected candidate discoverability examples, can provide the formatted discoverability examples for output at the user device 304. For instance, based on disambiguation engine 360 selecting the candidate discoverability examples for the "skip ahead" voice action, the "pause" voice action, and the "home" voice action, the formatting engine 380 can format the selected candidate discoverability examples and can control the user device 304 to provide the formatted discoverability examples for output. For instance, if each of the selected candidate discoverability examples is a textual notification that indicates the trigger terms used to trigger the voice actions corresponding to the selected discoverability examples, the formatting engine 380 may format the textual notifications and can cause the formatted textual notifications to be provided for output at a display of the user device 304. Thus, the formatted discoverability examples may be output at the user device 304 as shown in FIG. 3, by presenting the phrase "Try Saying:" followed by the trigger phrases used to trigger each of the "skip ahead," "pause," and "home" voice actions.

The user 305 may be presented with the textual notifications identifying the trigger phrases "skip ahead," "pause," and "home," and based on the discoverability examples being provided at the user device 304, the user 305 may provide a voice input to trigger one of the voice actions corresponding to the suggested trigger phrases. For example, the user 305 may provide the voice input "skip ahead" in response to being presented with the discoverability examples to control the media player application operating in the foreground of the user device 304 to skip ahead by a predetermined amount of time in a song that the media player application is currently playing.

Figure 4:
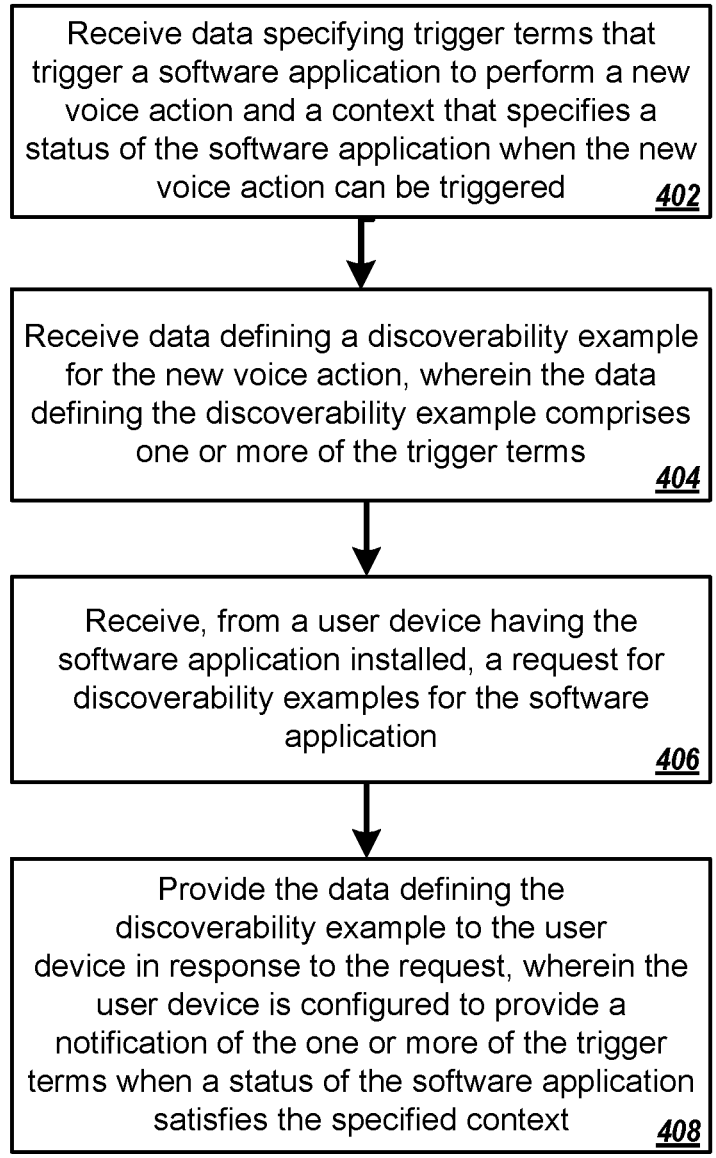
FIG. 4 is a flowchart of an example process associated with a voice action development system and service.

FIG. 4 is a flowchart of an example process 400 for establishing and providing discoverability examples for output at a user device. In some implementations, the process 400 may be performed by a voice action system, such as the voice action system 100 of FIGS. 1A to 1C.

The voice action system receives data specifying trigger terms that trigger a software application to perform a new voice action, and a context that specifies a status of the software application when the new voice action can be triggered (402). For example, an application developer 101a-101n using a terminal 102a-102n may submit information to the voice action system 100 for defining a new voice action for an application that is installed at one or more user devices 104. The information submitted by the application developer 101a-101n may specify a context that indicates a status of the software application when the new voice action can be triggered at a user device 104. The information may further specify trigger terms that a user 105 can speak into a user device 104 to trigger the voice action.

For example, an application developer 101a-101n may submit information to the voice action system 100 that defines a new "skip ahead" voice action for a media player application that controls the media player application to skip ahead by a predetermined amount of time in a song that the media player application is currently playing. The submitted information may include information indicating that the trigger phrase "skip ahead" is to be used to trigger the new voice action, and that the voice action can be triggered only when the media player application is operating in the foreground of the user device 104 and is operating in an audio player mode. The submitted information may include other information as well, such as information indicating the action to be performed in response to the voice action being triggered, or other information.

The voice action system receives data defining a discoverability example for the new voice action, wherein the data defining the discoverability example comprises one or more of the trigger terms that trigger the software application to perform the new voice action when a status of the software application satisfies the specified context (404). For example, the application developer 101a-101n may submit information to the voice action system 100 that specifies a discoverability example for the new voice action. The information submitted by the application developer 101a-101n and received by the voice action system 100 may specify one or more of the trigger terms that can be used by a user 105 to trigger the new voice action at the user device 104. In this way, the application developer 101a-101n can specify a discoverability example that can cause a notification to be provided for output at the user device 104 when a status of the software application installed on the user device 104 satisfies the specified context for the new voice action, where the notification presents the one or more of the trigger terms to the user 105 to inform the user 105 of the trigger terms that they can use to trigger the new voice action.

In some implementations, the information defining the new voice action may be in a particular required format that enables user devices to use the discoverability example to provide a notification of the one or more trigger terms. In other implementations, the voice action system 100 may receive information from the application developer 101a-101n that identifies the one or more trigger terms for the new voice action, or other information, but that is not in the particular required format. To generate a discoverability example in those instances, the voice action system 100 may induct the received data to generate data defining the discoverability example, where the data defining the discoverability examples generated through the induction process is in the particular required format. In other implementations, the voice action system 100 may generate the discoverability example based only on the received information specifying the new voice action, such as the information specifying trigger terms that trigger the software application to perform the new voice action. In other examples, the voice action system 100 may generate the discoverability example based on the received information specifying the new voice action and based on other information that specifies information about the discoverability example that is determined by the voice action system 100 or received at the voice action system 100 from the application developer 101a-101n. Such information can include, for instance, the content of the notification to associate with the discoverability example. In other examples, the voice action system 100 may determine one or more candidate discoverability examples, and receiving the data defining the discoverability example may involve receiving a selection by the application developer 101a-101n of a particular one of the candidate discoverability examples.

For example, the voice action system 100 may receiving information from the application developer 101a-101n that defines a discoverability example for the "skip ahead" voice action, where the data defining the discoverability example specifies the trigger term "skip ahead" that triggers the media player application to skip ahead by a predetermined amount of time in a song that the media player application is currently playing. The information received from the application developer 101a-101n may be in a particular required format, or the voice action system 100 may induct the information specifying the discoverability example for the "skip ahead" voice action to generate a discoverability example having the particular required format. In other examples, the voice action system 100 may induct the information specifying the "skip ahead" voice action itself, i.e., without receiving other information separately defining a discoverability example for the "skip ahead" voice action, to generate the data defining the "skip ahead" voice action. In other implementations, the voice action system 100 may determine candidate notifications for the "skip ahead" voice action based on the received information, and the application developer 101a-101n may select a particular candidate. The voice action system 100 may receive information defining the selected candidate discoverability example, or may receive information indicating the selection of the particular candidate and, in response to the selection, may generate a discoverability example for the "skip ahead" voice action according to the selection. The generated discoverability example can include information for a notification, such as a textual, image, audio, or video notification, that indicates the trigger term "skip ahead" used to trigger the voice action. In some examples, the application developer 101a-101n may submit additional information that includes notification content, and the voice action system 100 can generate a discoverability example for the "skip ahead" voice action that includes the notification content.

In some implementations, the data defining the discoverability example is associated with the software application at the voice action system 100, to enable a user device 104 having the software application installed to provide the notification for output when a context of the software application installed on the user device 104 satisfies the specified context. For example, the voice action system 100 may store the discoverability example at a voice action discoverability database 170 in association with the software application. Once stored in association with the software application, the discoverability example may be provided for output to a user 105 of a user device 104 when a context of the software application satisfies the context specified for the new voice action.

The voice action system receives, from a user device having the software application installed, a request for discoverability examples for the software application (406). For example, once the discoverability example is stored at the voice action discoverability example database 170, as shown in FIG. 1C, the voice action system 100 may receive a request from the user device 104 for discoverability examples for the software application. The user device 104 might request discoverability examples for the software application based on any number of reasons. For example, the user device 104 may request discoverability examples for the software application installed at the user device 104 based on determining that a status of the software application has changed, may request discoverability examples for the application based on a user 105 of the user device 104 launching the software application or bringing the software application to the foreground of the user device 104, may request discoverability examples for the application based on a periodic schedule or a schedule set by the user 105, or may otherwise request discoverability examples for the software application from the voice action system 100. In some examples, requests for discoverability examples received from the user device 104 may include contextual information indicating a status of the software application installed at the user device 104, such that the voice action system 100 may utilize the contextual information in selecting discoverability examples to provide to the user device 104.

The voice action system provides the data defining the discoverability example to the user device in response to the request, wherein the user device is configured, based at least on the data defining the discoverability example, to provide a notification of the one or more of the trigger terms when a status of the software application satisfies the specified context (408). For example, in response to the request received from the user device 104, the voice action system 100 may provide data defining the discoverability example for the new voice action to the user device 104 for storage at the user device 104, such as at the application metadata backend 180 of the user device 104. In some implementations, as shown in FIG. 1B, the voice action system 100 may be capable of determining that contextual information received from the user device 104, e.g., as the request for discoverability examples or along with a request for discoverability examples, satisfies the context specified for the new voice action, and may therefore determine to provide the data defining the discoverability example for the new voice action to the user device 104 to control or trigger output of a notification associated with the discoverability example at the user device 104. In other examples, as shown in FIG. 1C, once the voice action system 100 may provide the data defining the discoverability example to the user device 104 in response to the received request, and may store the data defining the discoverability example in association with the new voice action at the application metadata backend 180. Storing the data defining the discoverability example at the application metadata backend 180 may configure the user device 104 to output a notification associated with the discoverability example. For example, when the user device 104 determines that a status of the software application installed on the user device 104 satisfies the context specified for the new voice action, the user device 104 may provide a notification of the one or more trigger terms used to trigger the new voice action for output at the user device 104.

For instance, the discoverability example for the "skip ahead" voice action may be stored at the voice action discoverability example database 170 in association with the media player application. When contextual information received by the voice action system 100 from the user device 104 with or as the request for discoverability examples is determined to satisfy the context specified for the "skip ahead" voice action, the discoverability example for the "skip ahead" voice action is provided to the user device 104. The discoverability example received by the user device 104 causes the textual notification "Try Saying 'Skip Ahead'" to be provided for output at the user device 104. In another example, the voice action system 100 can provide data defining a discoverability example for the "skip ahead" voice action to the user device 104 in response to a request for discoverability examples. The user device 104 can store the discoverability example for the "skip ahead" voice action, for example, at the application metadata backend 180 or by caching the discoverability example for the "skip ahead" voice action in a cache memory of the user device 104. The user device 104 may then be capable of providing the textual notification "Try Saying 'Skip Ahead'" for output when a determination is made that the status of the media player application satisfies the context specified for the "skip ahead" voice action. For example, the textual notification may be presented in a region of a user interface displayed at the user device 104 that is configured to present discoverability examples for voice actions. Alternatively, the notification may be presented in a search results page displayed at the user device 104, may be provided for output in a separate window in a user interface displayed at the user device 104, may be provided as audio, an image, or video at the user device 104, or may otherwise be provided for output at the user device 104.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development of voice actions for use with applications installed on user devices, the described features may also be used with respect to machines, other devices, robots, or other systems. For example, the voice action system 100 of FIGS. 1A to 1C may be utilized to develop and implement voice actions and discoverability examples for interacting with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method implemented by one or more processors, comprising:
    receiving data defining a first voice action for a first software application, the data specifying a trigger phrase and specifying that the trigger phrase triggers performance of the first voice action by the first software application when a user device status satisfies one or more first conditions,
        wherein the one or more first conditions include a first set of temporal conditions;
    receiving data defining a second voice action for a second software application, the data specifying the trigger phrase and specifying that the trigger phrase triggers performance of the second voice action by the second software application when the user device status satisfies one or more second conditions,
        wherein the second software application is in addition to the first software application,
        wherein the second voice action is in addition to the first voice action wherein the one or more second conditions include a second set of temporal conditions, and
        wherein the first set of temporal conditions differ from the second set of temporal conditions in that the first set of temporal conditions include distinct times or distinct dates relative to the second set of temporal conditions;
    storing, in an application voice action database: the data defining the first voice action for the first software application, and the data defining the second voice action for the second software application; and
    when both the first software application and the second software application are operating on a user device:
        receiving, by a voice action system, audio data corresponding to spoken input from a user of the user device;
        determining, by the voice action system, the spoken input includes the trigger phrase,
            wherein determining the spoken input includes the trigger phrase comprises parsing the audio data corresponding to the spoken input to determine the spoken input includes the trigger phrase;
        determining, by the voice action system, the user device status of the user device;
        when the user device status of the user device satisfies the one or more first conditions and in response to determining the spoken input includes the trigger phrase:
            causing, by the voice action system, performance of the first voice action by the first software application; and
        when the user device status of the user device satisfies the one or more second conditions and in response to determining the spoken input includes the trigger phrase:
            causing, by the voice action system, performance of the second voice action by the second software application.

2. The method of claim 1, wherein the one or more first conditions further include that the first software application is operating in the foreground, and wherein the one or more second conditions further include that the second software application is operating in the foreground.

3. The method of claim 1, wherein the first software application is a media player application, and wherein performance of the first voice action by the media player application causes the media player application to:
    skip ahead, by a predetermined amount of time, in a song currently playing via the media player application, or
    skip ahead, from the song currently playing via the media player application, to a next song.

4. The method of claim 3, wherein the second software application is a photo album viewer application, and wherein performance of the second voice action by the photo album viewer application causes the photo album viewer application to:
    skip ahead, by a predetermined number of photos, from a photo currently displayed via the photo album viewer application, to a next photo.

5. The method of claim 1, wherein the one or more first conditions further include that the first software application is performing a first specific activity, and wherein the one or more second conditions further include that the second software application is performing a second specific activity.

6. The method of claim 1, further comprising:
    subsequent to storing, in the application voice action database, the data defining the first voice action for the first software application, and the data defining the second voice action for the second software application:
        receiving additional data defining the first voice action for the first software application, the additional data specifying an additional trigger phrase and specifying that the additional trigger phrase triggers performance of the first voice action by the first software application when the user device status satisfies the one or more first conditions;
        receiving additional data defining the second voice action for the second software application, the additional data specifying the additional trigger phrase and specifying that the additional trigger phrase triggers performance of the second voice action by the second software application when the user device status satisfies the one or more second conditions; and storing, in the application voice action database: the additional data defining the first voice action for the first software application, and the additional data defining the second voice action for the second software application.

7. The method of claim 1, wherein storing, in the application voice action database, the data defining the first voice action for the first software application, and the data defining the second voice action for the second software application, further comprises:

storing, in the application voice action database, in association with the data defining the first voice action for the first software application, and in association with the data defining the second voice action for the second software application:

data defining one or more pre-supported voice actions, the data specifying a pre-supported trigger phrase for each of the one or more pre-supported voice actions and specifying that the pre-supported trigger phrase triggers performance of a corresponding one of the one or more pre-supported voice actions.

8. The method of claim 1, wherein the parsed audio data corresponding to the spoken input includes at least a portion of the trigger phrase.

9. The method of claim 8, further comprising:

when both the first software application and the second software application are operating on the user device:
generating, based on the parsed audio data, a transcript of the spoken input;
determining, based on the transcript of the spoken input and the user device status of the user device, an intent associated with the spoken input;
identifying, based on the intent associated with the spoken input, a plurality of candidate voice trigger phrases; and
comparing the transcript of the spoken input to the candidate trigger phrases to determine the spoken input includes at least the portion of the trigger phrase.

10. The method of claim 1, wherein the one or more first conditions further include one of the user device being locked or unlocked, and wherein the one or more second conditions further include the other of the user device being locked or unlocked.

11. A system comprising, comprising:
one or more processors; and
memory storing instructions that, when executed, cause one or more of the processors to:
receive data defining a first voice action for a first software application, the data specifying a trigger phrase and specifying that the trigger phrase triggers performance of the first voice action by the first software application when a user device status satisfies one or more first conditions;
wherein the one or more first conditions include one of the user device being locked or unlocked;
receive data defining a second voice action for a second software application, the data specifying the trigger phrase and specifying that the trigger phrase triggers performance of the second voice action by the second software application when the user device status satisfies one or more second conditions,
wherein the second software application is in addition to the first software application,
wherein the second voice action is in addition to the first voice action, and
wherein the one or more second conditions include the other of the user device being locked or unlocked;
store, in an application voice action database: the data defining the first voice action for the first software application, and the data defining the second voice action for the second software application; and
when both the first software application and the second software application are operating on a user device:
receive, by a voice action system, audio data corresponding to spoken input from a user of the user device;
determine, by the voice action system, the spoken input includes the trigger phrase,
wherein determining the spoken input includes the trigger phrase comprises parsing the audio data corresponding to the spoken input to determine the spoken input includes the trigger phrase;
determine, by the voice action system, the user device status of the user device;
when the user device status of the user device satisfies the one or more first conditions and in response to determining the spoken input includes the trigger phrase:
cause, by the voice action system, performance of the first voice action by the first software application; and
when the user device status of the user device satisfies the one or more second conditions and in response to determining the spoken input includes the trigger phrase:
cause, by the voice action system, performance of the second voice action by the second software application.

12. The system of claim 11, wherein the one or more first conditions further include that the first software application is operating in the foreground, and wherein the one or more second conditions further include that the second software application is operating in the foreground.

13. The system of claim 11, wherein the first software application is a media player application, wherein the second software application is a photo album viewer application.

14. The system of claim 13, wherein performance of the first voice action by the media player application causes the media player application to:
skip ahead, by a predetermined amount of time, in a song currently playing via the media player application, or
skip ahead, from the song currently playing via the media player application, to a next song.

15. The system of claim 13, wherein performance of the second voice action by the photo album viewer application causes the photo album viewer application to:
skip ahead, by a predetermined number of photos, from a photo currently displayed via the photo album viewer application, to a next photo.

16. The system of claim 11, wherein the instruction further cause one or more of the processors to:
subsequent to storing, in the application voice action database, the data defining the first voice action for the first software application, and the data defining the second voice action for the second software application:
receive additional data defining the first voice action for the first software application, the additional data specifying an additional trigger phrase and specifying that the additional trigger phrase triggers performance of the first voice action by the first software application when the user device status satisfies the one or more first conditions;

receive additional data defining the second voice action for the second software application, the additional data specifying the additional trigger phrase and specifying that the additional trigger phrase triggers performance of the second voice action by the second software application when the user device status satisfies the one or more second conditions; and store, in the application voice action database: the additional data defining the first voice action for the first software application, and the additional data defining the second voice action for the second software application.

17. A non-transitory computer readable storage medium storing instructions executable by one or more processors, the instructions including instructions to:

receive data defining a first voice action for a first software application, the data specifying a trigger phrase and specifying that the trigger phrase triggers performance of the first voice action by the first software application when a user device status satisfies one or more first conditions, wherein the one or more first conditions include a first set of temporal conditions;

receive data defining a second voice action for a second software application, the data specifying the trigger phrase and specifying that the trigger phrase triggers performance of the second voice action by the second software application when the user device status satisfies one or more second conditions, wherein the second software application is in addition to the first software application, wherein the second voice action is in addition to the first voice action, wherein the one or more second conditions include a second set of temporal conditions, and wherein the first set of temporal conditions differ from the second set of temporal conditions in that the first set of temporal conditions include distinct times or distinct dates relative to the second set of temporal conditions;

store, in an application voice action database: the data defining the first voice action for the first software application, and the data defining the second voice action for the second software application; and when both the first software application and the second software application are operating on a user device:

receive, by a voice action system, audio data corresponding to spoken input from a user of the user device;

determine, by the voice action system, the spoken input includes the trigger phrase, wherein determining the spoken input includes the trigger phrase comprises parsing the audio data corresponding to the spoken input to determine the spoken input includes the trigger phrase;

determine, by the voice action system, the user device status of the user device;

when the user device status of the user device satisfies the one or more first conditions and in response to determining the spoken input includes the trigger phrase:

cause, by the voice action system, performance of the first voice action by the first software application; and when the user device status of the user device satisfies the one or more second conditions and in response to determining the spoken input includes the trigger phrase:

cause, by the voice action system, performance of the second voice action by the second software application.

* * * * *